US012449765B2

(12) United States Patent
Sato et al.

(10) Patent No.: US 12,449,765 B2
(45) Date of Patent: Oct. 21, 2025

(54) HOLOGRAPHIC IMAGING DEVICE AND HOLOGRAPHIC IMAGING METHOD

(71) Applicant: University of Hyogo, Kobe (JP)

(72) Inventors: Kunihiro Sato, Himeji (JP); Kensaku Shimoda, Himeji (JP)

(73) Assignee: University of Hyogo, Kobe (JP)

( * ) Notice: Subject to any disclaimer, the term of this patent is extended or adjusted under 35 U.S.C. 154(b) by 756 days.

(21) Appl. No.: 17/272,392

(22) PCT Filed: Aug. 29, 2019

(86) PCT No.: PCT/JP2019/033982
§ 371 (c)(1),
(2) Date: Mar. 1, 2021

(87) PCT Pub. No.: WO2020/045584
PCT Pub. Date: Mar. 5, 2020

(65) Prior Publication Data
US 2021/0325825 A1    Oct. 21, 2021

(30) Foreign Application Priority Data
Aug. 29, 2018    (JP) .................................. 2018-160899

(51) Int. Cl.
G03H 1/04    (2006.01)
G03H 1/00    (2006.01)
G03H 1/22    (2006.01)

(52) U.S. Cl.
CPC ......... *G03H 1/0443* (2013.01); *G03H 1/0005* (2013.01); *G03H 1/2202* (2013.01);
(Continued)

(58) Field of Classification Search
CPC .. G03H 1/0443; G03H 1/0005; G03H 1/2202; G03H 2001/005;
(Continued)

(56) References Cited

U.S. PATENT DOCUMENTS 6,008,914 A * 12/1999 Sasagawa ............ B23K 26/389
359/566
6,809,845 B1    10/2004 Kim et al.
(Continued)

FOREIGN PATENT DOCUMENTS

WO    WO 2011/089820 A1    7/2011
WO    WO 2012/005315 A1    1/2012
(Continued)

OTHER PUBLICATIONS

Weijuan Qu et al. (Quasi-physical phase compensation in digital holographic microscopy), vol. 26, No. 9, Sep. 2009, pp. 2-4 (Year: 2009).*

(Continued)

*Primary Examiner* — Joseph L Greene
(74) *Attorney, Agent, or Firm* — Crowell & Moring LLP

(57) ABSTRACT

The present invention provides a holographic imaging device and a holographic imaging method that have improved performance in which the influence of a refractive index of a cube-type beam coupler constituting an optical system is considered. The holographic imaging device 1 comprises the beam coupler 3 consisting of the cube-type beam splitter arranged between the object 4 and the image sensor 5 and the calculation reference light hologram generation unit 14 for generating an inline reference light hologram $j_L$ representing a light wave on the hologram plane 50 by performing a light wave propagation calculation including propagation inside the beam coupler 3, on a spherical wave emitted from the condensing point P2 of the inline spherical wave reference light L. The inline reference light hologram $j_L$ is a computer-generated hologram and used for generating an object light hologram g by removing component of the reference light L from a complex-amplitude inline hologram $J_{OL}$ representing the object light O and (Continued)

the inline spherical wave reference light L on the hologram plane 50.

18 Claims, 14 Drawing Sheets

(52) U.S. Cl.
CPC .............. *G03H 2001/005* (2013.01); *G03H 2001/0445* (2013.01); *G03H 2223/24* (2013.01); *G03H 2225/31* (2013.01); *G03H 2225/33* (2013.01)

(58) Field of Classification Search
CPC ....... G03H 2001/0445; G03H 2223/24; G03H 2225/31; G03H 2225/33
See application file for complete search history.

(56) References Cited

U.S. PATENT DOCUMENTS

| | | | |
|---|---|---|---|
| 8,194,124 | B2 | 6/2012 | Asundi et al. |
| 8,416,669 | B2 | 4/2013 | Sato |
| 9,581,961 | B2 | 2/2017 | Sato |
| 10,156,829 | B2 | 12/2018 | Sato |
| 10,209,673 | B2 | 2/2019 | Sato |
| 10,635,049 | B2 | 4/2020 | Sato |
| 11,644,791 | B2 | 5/2023 | Sato |
| 2004/0130762 | A1* | 7/2004 | Thomas ............... G03H 1/0443 359/15 |
| 2008/0265130 | A1* | 10/2008 | Colomb ............... G03H 1/0443 250/201.9 |
| 2010/0157307 | A1* | 6/2010 | Taillade ............... G01N 21/453 356/457 |
| 2012/0287244 | A1* | 11/2012 | Bennett ............... G02B 21/16 348/46 |
| 2014/0374575 | A1* | 12/2014 | Takesue ............. G01B 9/02003 250/208.5 |
| 2015/0268628 | A1* | 9/2015 | Sato .................... G01B 9/02091 356/457 |
| 2019/0250392 | A1* | 8/2019 | Cuche .................. G03H 1/0443 |

FOREIGN PATENT DOCUMENTS

| | | |
|---|---|---|
| WO | WO 2014/054776 A1 | 4/2014 |
| WO | WO 2015/064088 A1 | 5/2015 |
| WO | WO 2018/038064 A1 | 3/2018 |

OTHER PUBLICATIONS

Qu, W. et al., "Quasi-physical phase compensation in digital holographic microscopy", Journal of the Optical Society of America, A, Optics and Image Science, Optical Society of America, US, Sep. 1, 2009, pp. 2005-2011, vol. 26, No. 9, XP009141972 (seven (7) pages).

Supplementary European Search Report issued in European Application No. 19853383.8 dated Sep. 16, 2021 (eight (8) pages).

International Search Report (PCT/ISA/210) issued in PCT Application No. PCT/JP2019/033982 dated Oct. 8, 2019 with English translation (five (5) pages).

Japanese-language Written Opinion (PCT/ISA/237) issued in PCT Application No. PCT/JP2019/033982 dated Oct. 8, 2019 (three (3) pages).

Zhang et al. "Reconstruction algorithm for high-numerical-aperture holograms with diffraction-limited resolution" Optics Letters, vol. 31, No. 11, Jun. 1, 2006, 3 pages.

Restrepo et al., "Automatic three-dimensional tracking of particles with high-numerical-aperture digital lensless holographic microscopy" Optics Letters, vol. 37, No. 4, Feb. 15, 2012, 3 pages.

\* cited by examiner

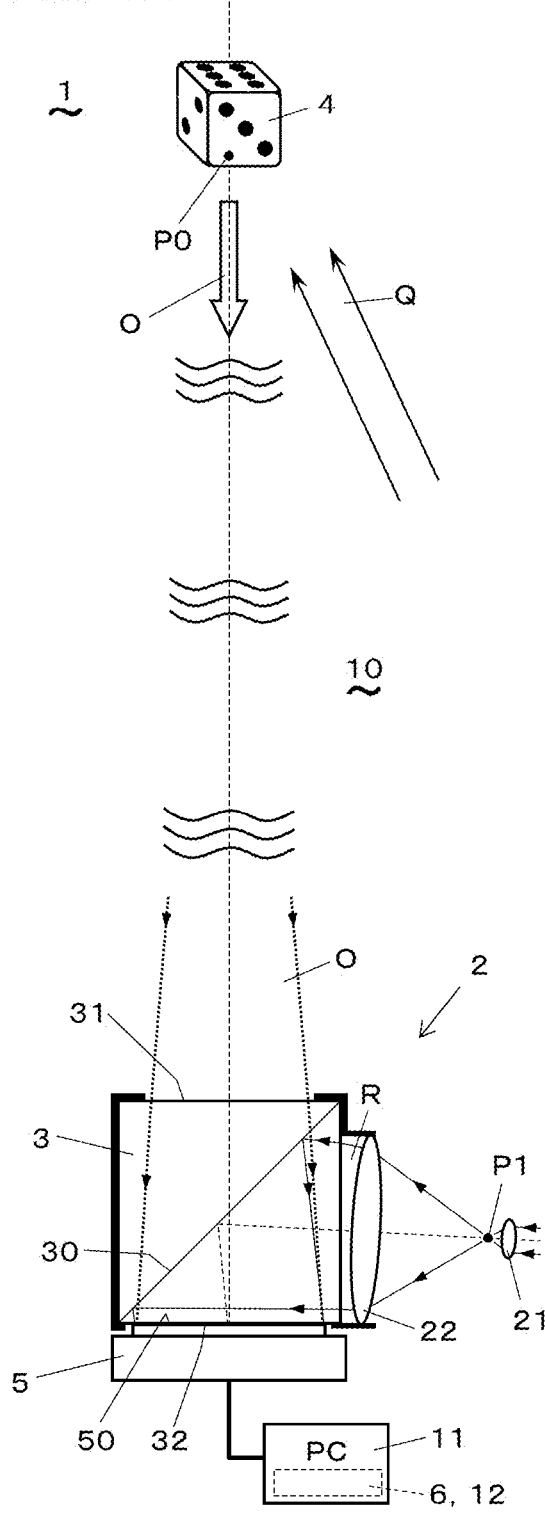
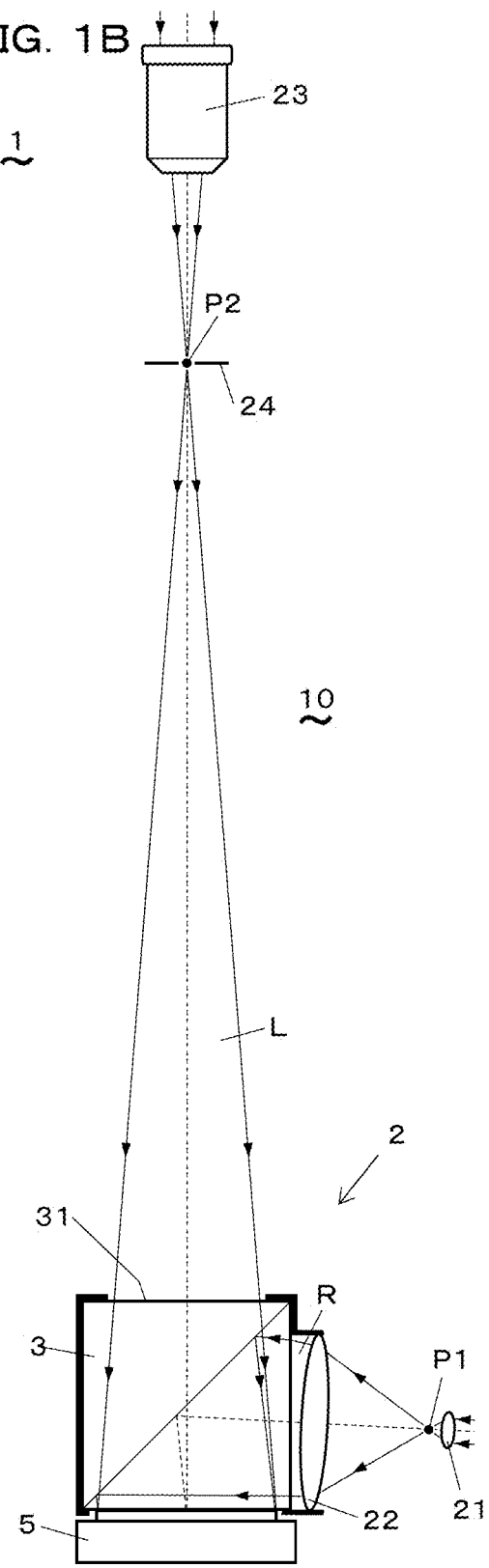

FIG. 15A
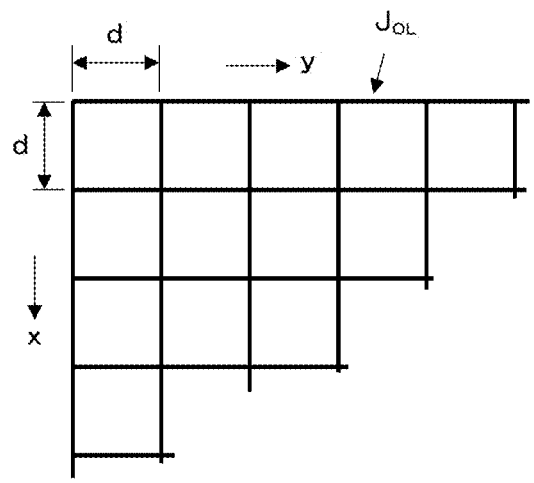
FIG. 15B
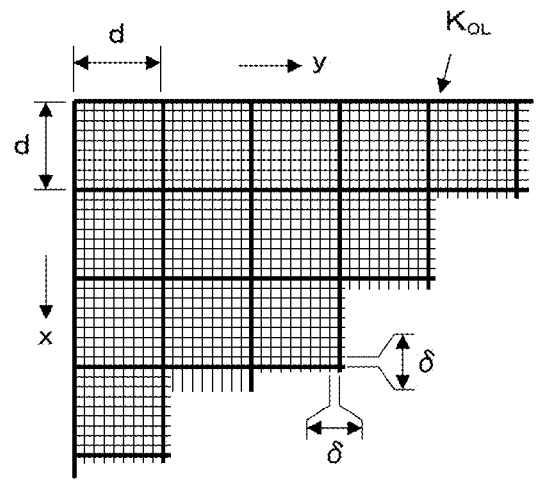
FIG. 16A
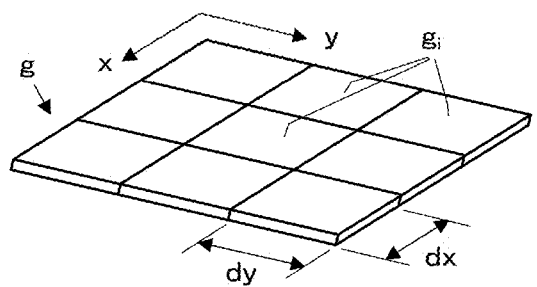
FIG. 16B
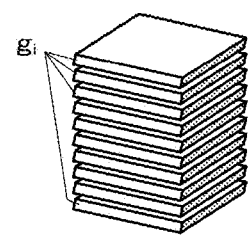
FIG. 16C

HOLOGRAPHIC IMAGING DEVICE AND HOLOGRAPHIC IMAGING METHOD

TECHNICAL FIELD

The present invention relates to a holographic imaging device and a holographic imaging method in digital holography.

BACKGROUND ART

Conventionally, as a technique for analyzing light waves such as reflected light and transmitted light, there is holography by which data of light intensity and phase are recorded together, on a recording medium such as a photographic plate called a hologram, and analyzed. In recent years, holography has been performed to acquire the intensity and phase of a light wave as digital data using an image sensor and a semiconductor memory or to generate a hologram on a computer for analysis. Such holography is called digital holography.

In the digital holography, various technologies have been proposed for achieving higher speed and higher accuracy in hologram data acquisition and processing, and have been applied to imaging. For example, a digital holography has been known, in which spatial frequency filtering and spatial heterodyne modulation are applied to hologram data acquired by one shot, and a complex amplitude inline hologram for reconstructing an object image is generated at a high speed and accurately (for example, patent document 1).

In order to solve the problem of the conventional optical microscope, a method for accurately acquiring object light of a large numerical aperture by one shot using holography without using any imaging lens and a method for accurately reconstructing high resolution three-dimensional image on a computer by expanding the recorded object light into plane waves are known (for example, patent document 2). According to these method, a lensless three-dimensional microscope is realized, and such a microscope is capable of acquiring and reconstructing an undistorted high-resolution three-dimensional moving image. Since such a microscope does not use any imaging lens, it is possible to solve the problem of the conventional optical microscope, namely, the problem caused by the influence of the medium and the imaging lens.

Moreover, there is known a high resolution tomography, which uses a reflection type lensless holographic microscope and wavelength sweep laser light, for measuring the cell in culture solution or the structure in a living body tissue with high resolution (for example, patent documents 3).

Furthermore, there is known a method for reconstructing an object light under a synthetic numerical aperture exceeding 1, by synthesizing a plurality of large numerical aperture object light holograms in which object lights of large numerical aperture are recorded as hologram data for each incident angle of illumination light, wherein the object lights are emitted lights from an object illuminated with illumination lights having different incident directions (for example, patent document 4). According to this method, an ultra-high resolution three-dimensional microscope having a resolution exceeding usual diffraction limit can be realized.

In addition, there is known a holographic ellipsometry device that uses accurate recording of light waves by one-shot digital holography and plane wave expansion of recorded light waves (for example, see patent document 5). According to this ellipsometry device, since data of reflected lights of non-parallel illumination lights having a large number of incident angles are collectively recorded in one hologram, the ellipsometry can be performed for each of a large number of wave number vectors corresponding to the incident angle in order to obtain the ellipsometric angles LP and A, and the measurement efficiency can be improved.

Further, a lensless small holographic microscope is known, in which one cube-type beam splitter is used for dividing a diverging beam into an illumination light and a reference light and the cube-type beam splitter is used as a beam coupler for combining an object light and the reference light (for example, see patent document 6).

PRIOR ART DOCUMENTS

Patent Documents

Patent document 1: WO2011/089820
Patent document 2: WO2012/005315
Patent document 3: WO2014/054776
Patent document 4: WO2015/064088
Patent document 5: WO2018/038064
Patent document 6: U.S. Pat. No. 8,194,124

DISCLOSURE OF THE INVENTION

In the holography as shown in the above-mentioned patent documents 1 to 5, the object light and the off-axis reference light are directly incident on the image sensor, or the object light reflected by a plate-type or pellicle-type beam splitter and the off-axis reference light transmitted through the plate-type or pellicle-type beam splitter are incident on the image sensor.

By using a plate-type or pellicle-type beam splitter as a beam coupler, the reference light and the object light of different propagation directions can be easily overlapped, and optical system design becomes easier since a light source of the reference light can be placed away from an object.

However, the plate-type beam splitter has a problem that multiple reflected lights generated in the plate overlap the object light and are recorded. Further, the pellicle type beam splitter can substantially suppress the influence of the multiple reflection lights, but there is a problem that the quality of the recording hologram is deteriorated due to another influence caused by vibration of the pellicle (thin film). Further, the pellicle type beam splitter has a problem that it is difficult to obtain high flatness due to breaking or deforming.

In addition, in the holographic microscope as disclosed in patent document 6 described above, the cube-type beam splitter is simply used as an optical component that is easy to use and can avoid the problems of multiple reflection and flatness. That is, in the conventional holography, the influence and effect of the cube-type splitter having a refractive index different from that of air are not taken into consideration, and there is room for improving the performance.

The present invention has been made to solve the above problems, and it is an object of the present invention to provide a holographic imaging device and method having improved performance by considering the influence of the refractive index of a cube-type beam splitter forming an optical system.

In order to attain the above-mentioned subject, the holographic imaging device of the present invention comprises:
a data acquisition unit for acquiring data of an object light (O) emitted from an illuminated object and data of an inline spherical wave reference light (L) being inline with the object light (O), electronically and individually, as two kinds of off-axis holograms ($I_{OR}$, $I_{LR}$) on a hologram plane defined at a light receiving surface of an image sensor, using an off-axis reference light (R) maintained under the same conditions; and an image reconstruction unit for reconstructing an image of the object from the data acquired by the data acquisition unit, wherein the data acquisition unit comprises:

a beam coupler, consisting of a cube-type beam splitter, used for acquiring the data of lights passing through the beam coupler and being incident on the image sensor as the data of the two kinds of the off-axis holograms ($I_{OR}$, $I_{LR}$), the image reconstruction unit comprises:

a complex amplitude hologram generation unit for generating a complex amplitude inline hologram ($J_{OL}$) on the hologram plane, containing information on both of the object light (O) and the inline spherical wave reference light (L), from the data of the two kinds of the off-axis holograms ($I_{OR}$, $I_{LR}$);

a calculation reference light hologram generation unit for generating an inline reference light hologram ($j_L$) representing a light wave of the inline spherical wave reference light (L) on the hologram plane by performing a light wave propagation calculation including propagation calculation inside the beam coupler in consideration of refractive index of the beam coupler; and an object light hologram generation unit for generating an object light hologram (g) being a hologram of the object light (O), on the hologram plane, using the data of the complex amplitude inline hologram ($J_{OL}$) and the inline reference light hologram ($j_L$).

Moreover, the holographic imaging method of the present invention, comprises the steps of:

acquiring data of an object light (O), emitted from an illuminated object and propagating straight within a beam coupler consisting of a cube-type beam splitter and incident on an image sensor, as an object light off-axis hologram ($I_{OR}$) using an off-axis reference light (R) incident on the beam coupler from a side surface thereof, reflected therein, and incident on the image sensor;

acquiring data of the off-axis reference light (R) as a reference light off-axis hologram ($I_{LR}$) by the image sensor using an inline spherical wave reference light (L) being inline with the object light (O);

generating a complex amplitude inline hologram ($J_{OL}$) on a hologram plane defined at a light receiving surface of the image sensor from the data of the two kinds of the off-axis holograms ($I_{OR}$, $I_{LR}$);

generating an inline reference light hologram ($J_L$) representing a light wave of the inline spherical wave reference light (L) on the hologram plane by performing a light wave propagation calculation, on a spherical wave emitted from a condensing point (P2) of the inline spherical wave reference light (L), including propagation calculation inside the beam coupler in consideration of refractive index of the beam coupler; and generating an object light hologram (g) representing a hologram of the object light (O) on the hologram plane, using the data of the complex amplitude inline hologram ($J_{OL}$) of the object light and the data of the inline reference light hologram ($j_L$).

According to the holographic imaging device and the holographic imaging method of the present invention, since the inline reference light hologram $j_L$ for removing the component of the reference light L from the complex amplitude inline hologram $J_{OL}$ is generated in consideration of the refractive index of the beam coupler by performing light wave propagation calculation, the object light hologram g can be generated with high accuracy.

BRIEF DESCRIPTION OF THE DRAWINGS

FIG. 1A is a side view of the holographic imaging device according to the 1st embodiment of the present invention showing a state in which the object light off-axis hologram is acquired thereby, and FIG. 1B is a side view of the device showing a state in which the reference light off-axis hologram is acquired thereby.

FIG. 15A is a partial plan view of a hologram to be processed in the holographic imaging method according to the 8th embodiment, and FIG. 15B is a plan view showing how to increase the spatial sampling number in the hologram of FIG. 15A.

FIG. 16A is a conceptual diagram of a hologram to which a method for processing a hologram at high speed is applied, FIG. 16B is a conceptual diagram in which divided holograms are overlaid, and FIG. 16C is a conceptual diagram of a synthesized hologram made by synthesizing the holograms of FIG. 16B.

MODE FOR CARRYING OUT THE INVENTION

Figure 2:
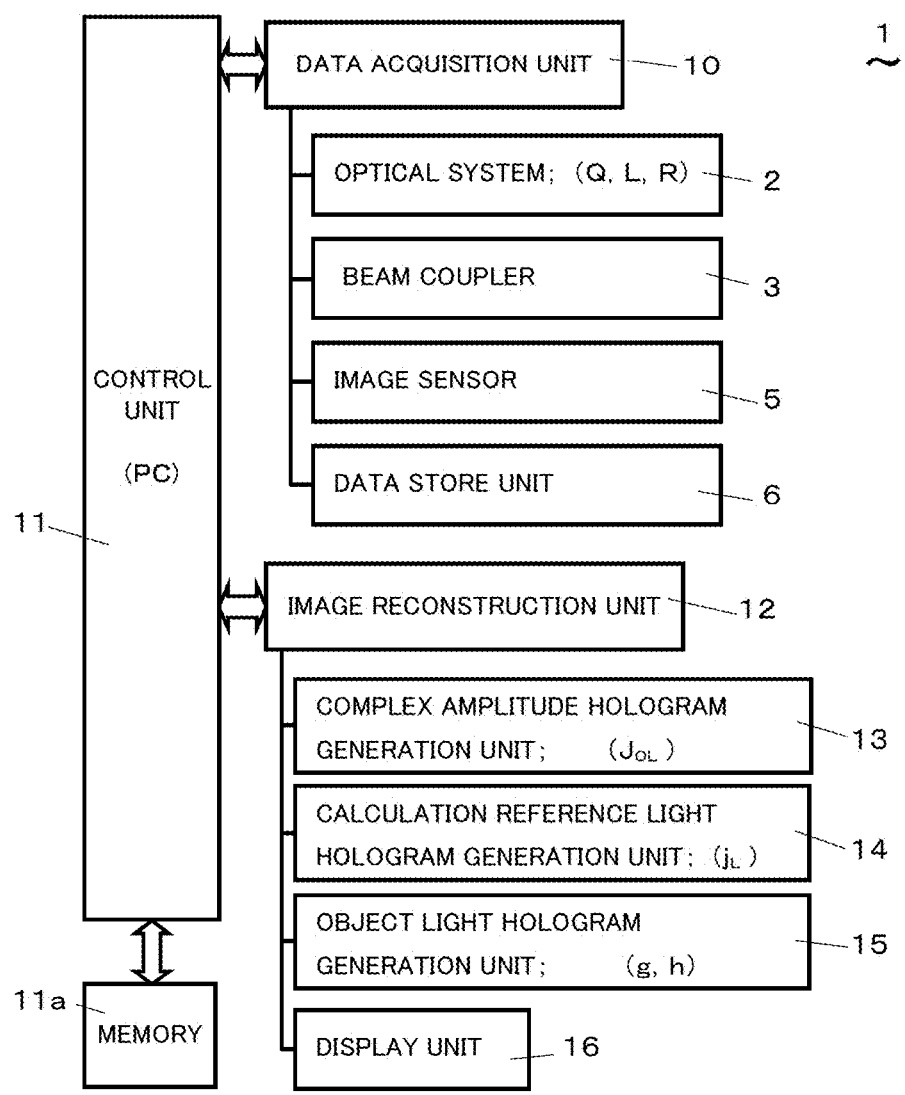
FIG. 2 is a block diagram of the device.

Hereinafter, the holographic imaging device and method according to embodiments of the present invention are described with reference to the drawings.

1st Embodiment: Holographic Imaging Device

The holographic imaging device 1 according to the 1st embodiment is described with reference to FIG. 1A, FIG. 1B and FIG. 2. As shown in FIG. 1A and FIG. 1B, the holographic imaging device 1 comprises the data acquisition unit 10 that acquires and electronically stores data of the object light O emitted from the object 4 illuminated by the illumination light Q, and the image reconstruction unit 12 that reconstructs an image of the object 4 from the data acquired by the data acquisition unit 10. The holographic imaging device 1 of this embodiment is an imaging device having a long working distance.

The data acquisition unit 10 comprises the image sensor 5 for converting light intensity into electric signals and outputs them as hologram data, the beam coupler 3 arranged between the object 4 and the image sensor 5, the optical system 2 for shaping and propagating lights, and the data storage unit 6 for storing acquired data. The holographic imaging device 1 includes the control unit 11 including a computer that controls the data acquisition unit 10 and the image reconstruction unit 12, and the memory 11a that stores calculation programs such as FFT and control data. The data storage unit 6 is provided in the control unit 11 together with the image reconstruction unit 12. Each unit is described below.

The optical system 2 generates the illumination light Q, the inline spherical wave reference light L used as an inline light being inline with the object light O, and the off-axis reference light R used as an off-axis light for the object light O from a coherent light emitted by a light source, and propagates those generated lights and and the object light O. The optical system 2 combines the object light O or the inline spherical wave reference light L and the off-axis reference light R and makes them incident on the image sensor 5 by using a cube-type beam splitter as the beam coupler 3.

The beam coupler 3 has the internal reflecting mirror 30 in a translucent block, and is constructed by joining the 45° slopes of two right angle prisms. The joined slope serves as the internal reflecting mirror 30 of semi-transparency, One surface of the pair of parallel surfaces facing the internal reflecting mirror 30 becomes the incident surface 31 of the object light O or the inline spherical wave light L, and the other surface thereof becomes an exit surface 32 facing the light receiving surface of the image sensor 5, wherein the light receiving surface defines the hologram plane 50. Further, another set of parallel surfaces facing the internal reflecting mirror 30, that is, one of the side surfaces of the beam coupler 3 is an incident surface of the off-axis reference light R. The beam coupler 3 has a light antireflection treatment layer and a light absorption treatment layer on its surface, and also has a dark box structure for blocking external light, which prevents noise light generation and stray light entry.

The optical system for the off-axis reference light R has the small diameter condenser lens 21 and the large diameter collimator lens 22. The reference light R is condensed at the condensing point P1 by the condenser lens 21, passes through the collimator lens 22, enters the beam coupler 3, is reflected by the internal reflecting mirror 30, and enters the image sensor 5. The optical axis of the reference light R is inclined with respect to the normal line of the image sensor 5 in order to make the reference light R off-axis. Since the reference light R has the condensing point P1, it becomes spherical wave-like light.

The optical system for the inline spherical wave reference light L includes the condenser lens 23 for generating a spherical wave, and the pinhole plate 24 having a pinhole at the position of the condensing point P2 by the condenser lens 23. The optical axis of the condenser lens 23 coincides with the optical center axis toward the center of the image sensor 5. The light that has passed through the condenser lens 23 forms the condensing point P2 at the position of the pinhole and then propagates straight while spreading and enters the image sensor 5. The optical system for the inline spherical wave reference light L includes the pinhole plate 24 having the pinhole at the position of the condensing point P2 to generate the inline spherical wave reference light L as a spherical wave without distortion or noise.

The information on the position of the condensing point P2 of the inline spherical wave reference light L is important information used for obtaining, by calculation, the light intensity distribution and the phase distribution formed by the inline spherical wave reference light L on the hologram plane 50 after passing through the beam coupler 3. The information on the position of the condensing point P2 can be obtained by acquiring hologram data of a scale plate or the like using the inline spherical wave reference light L as the illumination light and reconstructing the image.

Since the condensing point P2 is on the center normal of the image sensor 5, the inline spherical wave reference light L has an inline relationship with the object light O when the object light hologram and the reference light hologram are superimposed on each other. The off-axis reference light R is set to have an off-axis relationship with the object light O, and similarly has an off-axis relationship with the inline spherical wave reference light L. The off-axis reference light R is a spherical wave-like light having the condensing point P1, and the condensing point P1 of the off-axis reference light R and the condensing point P2 of the inline spherical wave reference light L are set to be optically close to each other. With this setting, the spatial frequency band of a reference light hologram $I_{LR}$ can be narrowed.

As shown in FIG. 2, the image reconstruction unit 12 of the holographic imaging device 1 comprises the complex amplitude hologram generation unit 13, the calculation reference light hologram generation unit 14, and the object light hologram generation unit 15. The complex amplitude hologram generation unit 13 generates a complex amplitude inline hologram $J_{OL}$ of the object light, on the hologram plane 50 at the surface of the image sensor 5, from the data of an object light off-axis hologram $I_{OR}$ and the reference light off-axis hologram $I_{LR}$.

The calculation reference light hologram generation unit 14 generates an inline reference light hologram $j_L$ representing a light wave on the hologram plane 50, by performing a light propagation calculation, including the propagation calculation in the beam coupler 3, on a spherical wave emitted from the condensing point P2 of the inline spherical wave reference light L.

The object light hologram generation unit 15 generates an object light hologram g on the hologram plane 50 using the data of the complex amplitude inline hologram $J_{OL}$ of the object light and the data of the inline reference light hologram $j_L$, and generates a reconstructed object light hologram h, to be used for image reconstruction at the position of the object 4 by propagating the generated object light hologram g by the light propagation calculation and stores it.

Next, the operation of the holographic imaging device 1 is described. In the configuration of FIG. 1A, the illumination light Q is emitted to the object 4 arranged in front of the image sensor 5 and on the center normal line thereof, and the object light O is emitted from the object 4. The object light O spreads radially from around the point P0 on the object surface on the center normal of the image sensor 5, enters the beam coupler 3, and they are superimposed by the off-axis reference light R which entering from the side, and is received by the image sensor 5. The data of the light intensity distribution of the interference fringes formed by the object light O and the reference light R on the hologram plane 50, that is, the data of the object light O is acquired by the image sensor 5 as the object light off-axis hologram $I_{OR}$, and stored in the data storage unit 6.

Further, in the configuration of FIG. 1B with the object 4 removed, the data of the light intensity distribution of the interference fringes of the inline spherical wave reference light L and the off-axis reference light R, that is, the data of the off-axis reference light R is acquired by the image sensor 5 as the reference light off-axis hologram $I_{LR}$ and stored in the data storage unit 6.

The data of the object light off-axis hologram $I_{OR}$ and the reference light off-axis hologram $I_{LR}$ stored in the data storage unit 6 are processed by the image reconstruction unit 12 to generate the reconstructed object light hologram h for image reconstruction at the position of the object 4. A light intensity image $|h|^2$, for example, is derived from the reconstructed object light hologram h and displayed on the display unit 16. The display unit 16 is an FPD such as a liquid crystal display device, and displays an image or the like. Except for the display unit 17, each unit of the image reconstruction unit 12 is configured which programs and software including a group of subroutines running on a computer.

2nd Embodiment: Data Processing Method

The data processing method of the holographic imaging method according to the 2nd embodiment is described with reference to FIG. 3 to FIG. 6. As an example of a device to which the method is applied, the device of the 1st embodiment (FIG. 1A, FIG. 1B and FIG. 2) also are referred to. The present data processing method can be applied to a holographic imaging device having a long working distance and a wide field of view, and a holographic imaging device for realizing a transmission type or a reflection type microscope with a high numerical aperture or a synthetic numerical aperture of more than 1.

Figure 3:
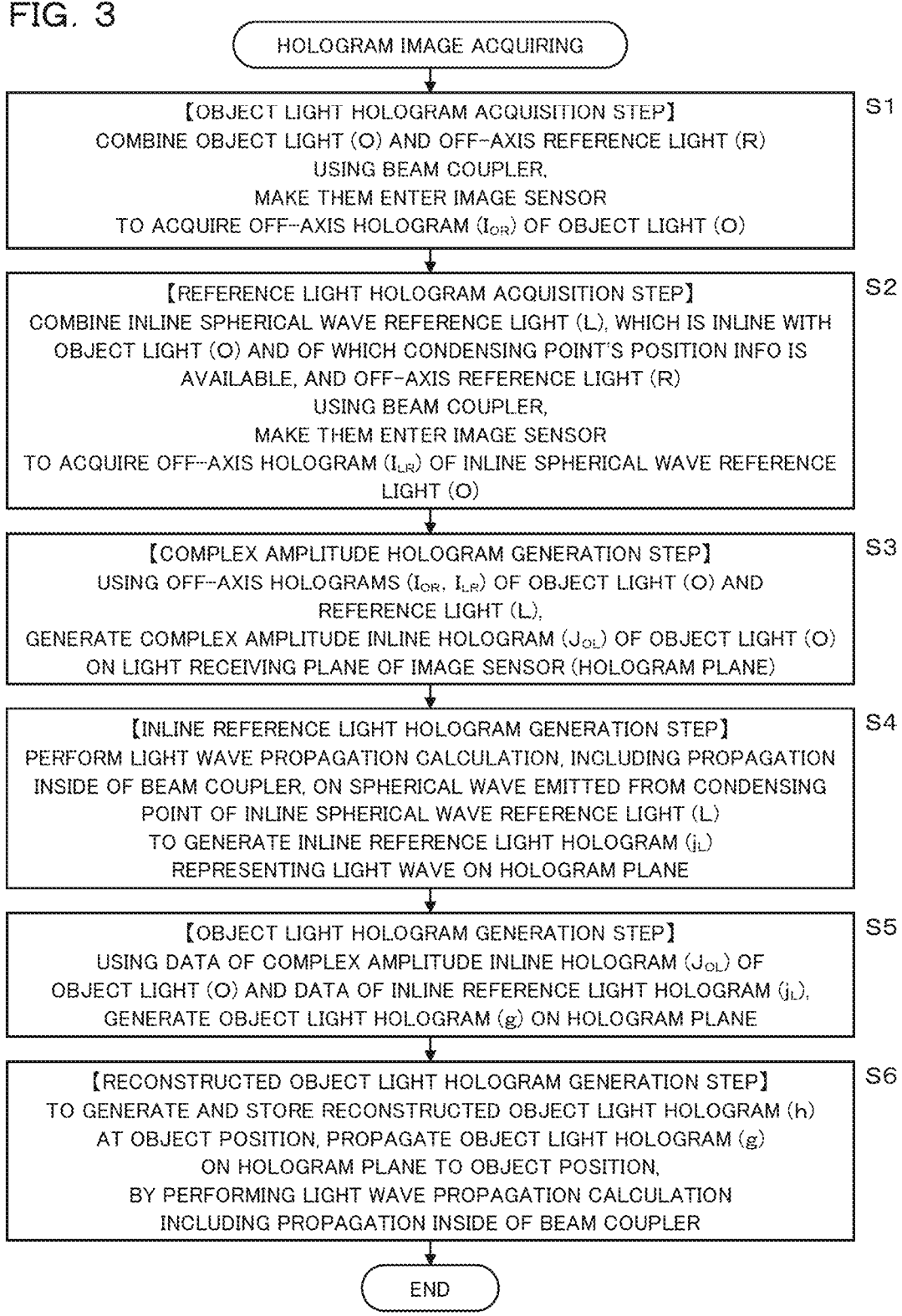
FIG. 3 is a flowchart showing the holographic imaging method according to the 2nd embodiment.

As shown in FIG. 3, this data processing method includes steps from the object light hologram acquisition step (S1) to the reconstructed object light hologram generation step (S6).

In the object light hologram acquisition step (S1), the data of the object light O emitted from the object 4 illuminated by the illumination light Q is acquired as the object light off-axis hologram $I_{OR}$ using the off-axis reference light R. The object light O propagates straight within the cube-type beam coupler 3 used as a beam coupler and is incident on the image sensor 5. The off-axis reference light R is incident from the side surface of the beam coupler 3, reflected inside the beam coupler 3, and incident on the image sensor 5.

In the reference light hologram acquisition step (S2), when the object 4, the illumination light Q, or the object light O is absent, the data of the off-axis reference light R incident on the image sensor 5 is acquired as the reference light off-axis hologram $I_{LR}$ using the inline spherical wave reference light L. The inline spherical wave reference light L is a light that becomes inline with respect to the object light O and propagates straight within the beam coupler 3 to enter the image sensor 5. This step (S2) and the above-mentioned step (S1) may be performed in reverse order.

In the complex amplitude hologram generating step (S3), the complex amplitude inline hologram $J_{OL}$ of the object light is generated on the hologram plane 50, which is at the surface of the image sensor 5, from the data of the object light off-axis hologram $I_{OR}$ and the reference light off-axis hologram $I_{LR}$.

In the inline reference light hologram generation step (S4), the light propagation calculation including the propagation in the beam coupler 3 is performed on the spherical wave emitted from the condensing point P2 of the inline spherical wave reference light L, and the inline reference light hologram $j_L$ representing the light wave on the hologram plane 50 after passing the beam coupler is generated.

In the object light hologram generation step (S5), the object light hologram g on the hologram plane 50 is generated using the data of the complex amplitude inline hologram $J_{OL}$ of the object light and the data of the inline reference light hologram In the reconstruction object light hologram generation step (S6), the object light hologram g is converted by light propagation calculation, and the reconstructed object light hologram h for image reconstruction at the position of the object 4 is generated and stored. The captured image of the object 4 can be viewed as a light intensity image, for example, by displaying the square of the absolute value of the reconstructed object light hologram h, that is, $|h|^2$, on the display of the computer.

(Hologram Data and its Processing)

Hologram data and its processing are explained based on mathematical expressions. The off-axis reference light R, the inline spherical wave reference light L, the object light O, etc. are involved in the hologram. Here, the origin of the xyz right-handed orthogonal coordinate system is set at the center of the hologram plane 50 (at the light receiving surface of the image sensor 5). The direction from the hologram plane 50 toward the light source of the object light O is the positive direction of the z axis. The object light O(x, y, t), the off-axis reference light R(x, y, t), and the inline spherical wave reference light L(x, y, t) are represented in the following general equations (1), (2), and (3), respectively, by using the position coordinates (x, y). Those lights having angular frequency ω are coherent with each other.

Coefficients, arguments, subscripts, etc. in each equation are interpreted in a general expression and meaning. In each of the following equations, the position coordinates (x, y, z), the spatial frequency (u, v, w), etc. are omitted as appropriate.

$$O(x,y,t)=O_0(x,y)\exp[i(\phi_O(x,y)-\omega t)] \quad (1)$$

$$R(x,y,t)=R_0(x,y)\exp[i(\phi_R(x,y)-\omega t)] \quad (2)$$

$$L(x,y,t)=L_0(x,y)\exp[i(\phi_L(x,y)-\omega t)] \quad (3)$$

The light intensity $I_{OR}(x, y)$ of a light composed of L(x, y, t) and R(x, y, t), and the light intensity $I_{LR}(x, y)$ of a light composed of O(x, y, t) and R(x, y, t) are expressed by following equations (4) and (5), respectively. Those light intensities $I_{OR}$ and $I_{LR}$ are acquired as hologram data by the image sensor 5.

$$I_{OR}(x,y)=O^2{}_0+R^2{}_0+O_0R_0\exp[i(\phi_O-\phi_R)]+O_0R_0\exp[-i(\phi_O-\phi_R)] \quad (4)$$

$$I_{LR}(x,y)=L^2{}_0+R^2{}_0+L_0R_0\exp[i(\phi_L-\phi_R)]+L_0R_0\exp[-i(\phi_L-\phi_R)] \quad (5)$$

In the above equations (4) and (5), the 1st term on the right side is the light intensity component of the object light O or the inline spherical wave reference light L, and the 2nd term is the light intensity component of the off-axis reference light R. The 3rd term and the 4th term of each equation are a direct image component and a conjugate image component, which are created as modulation results of the object light O or the inline spherical wave reference light L made by the off-axis reference light R, respectively.

Note that the direct image component of the 3rd term includes information of the object light O or the reference light L necessary for the present data processing method, that is, $O_0\exp(i\phi_O)$ or $L_0\exp(i\phi_L)$ of the above equations (1) and (3). In the direct image component of the 3rd term, the phase portions $[i\phi_O]$ and $[i\phi_L]$ of the object light O or the reference light L is equal to the phase portion $[i\phi_O]$ or $[i\phi_L]$ in above equations (1) and (3) defining those lights. On the other hand, in the 4th term, the phase portions $[-i\phi_O]$ or $[-i\phi_L]$ of the object light O or the reference light L is a complex conjugate of the phase portion $[i\phi_O]$ or $[i\phi_L]$ in above equation (1) or (3) defining those light, and accordingly, the 4th term is called a conjugate image component.

By using the off-axis reference light R and its off-axis effect, such a hologram can be acquired in which the direct image component (the 3rd term) is separated from the light intensity components (the 1st and 2nd terms) and the conjugate image component (the 4th term) when the hologram is expressed in a spatial frequency space. Therefore, by applying spatial frequency filtering, only the 3rd terms of above equations (4) and (5) are extracted, and the object light complex amplitude hologram $J_{OR}$ in which the object light O is recorded and the complex amplitude hologram JAR in which the inline spherical wave reference light L is recorded are derived, respectively, as shown in the following equations (6) and (7). Those complex amplitude holograms are holograms still containing the components of off-axis reference light R.

$$J_{OR}(x,y)=(O_0(x,y)R_0(x,y)\exp[i(\phi_O(x,y))] \quad (6)$$

$$J_{LR}(x,y)=(L_0(x,y)R_0(x,y)\exp[i(\phi_L(x,y))] \quad (7)$$

The spatial frequency filtering is performed by Fourier transforming above equations (4) and (5) into equations expressed in the spatial frequency space, filtering using bandpass filter, and then inverse-Fourier transforming. For reference, if the pixels in the image sensor are two-dimensionally arranged with a pixel pitch d, the highest spatial frequency fs of the hologram, recordable by using such a image sensor, becomes a spatial frequency fs=1/d.

By dividing above equation (6) by equation (7), the amplitude $R_0$ and the phase $\phi_R$ of the off-axis reference light R can be removed from the equation (6). This processing is processing for performing phase subtraction, that is, processing for frequency conversion, and is processing for heterodyne modulation. As a result, the complex amplitude inline hologram $J_{OL}$ of the object light O with respect to the inline spherical wave reference light L is obtained as shown in the following equation (8).

$$J_{OR}(x,y)=(O_0(x,y)/L_0(x,y))\exp[i(\phi_O(x,y)-\phi_L(x,y))] \quad (8)$$

The inline spherical wave reference light L is a reference light for acquiring and storing the data of the reference light R as the reference light hologram $I_{LR}$ which is an off-axis hologram, and also serves as a standard light in digital processing of hologram data. The inline spherical wave reference light L is used to generate the complex amplitude inline hologram $J_{OL}$ that is a hologram not including the data of the reference light R.

When data of a plurality of object light holograms $I^j{}_{OR}$ are acquired for each incident direction of illumination lights $Q^j$ having changed incident directions $\theta^j$ with respect to the object, for example, the processing of above equation (8) can be performed to those holograms $I^j{}_{OR}$ by using a common reference light hologram $I_{LR}$. In other words, it is enough one off-axis hologram $I_{LR}$ may be acquired and one complex amplitude hologram $J_{LR}$ may be generated. In this case, the off-axis reference light R used for acquiring the plurality of holograms $I^j{}_{OR}$ needs to be maintained under the same condition.

(Inline Spherical Wave Reference Light L Component and Multiplication Factor)

By multiplying both sides of equation (8) by a multiplication factor $L_0(x, y)\exp(i\phi_L(x, y))$, the components of the inline spherical wave reference light L can be eliminated from equation (8), and a hologram (object light hologram) which contains only the light wave $O_0(x, y)\exp(i\phi_O(x, y))$ of the object light O can be generated. The term "hologram" is used in the sense that it includes all the data necessary for reconstructing a light wave, and is also used in the same meaning below. As to the amplitude $L_0(x, y)$ of the inline spherical wave reference light L, you may leave it, if it changes gently and if you can ignore it.

The above-mentioned multiplication factor $L_0(x, y)\exp(i\phi_L(x, y))$ is a hologram representing a light wave, which is emitted from the condensing point P2 of the inline spherical wave reference light L as a spherical wave and received by the image sensor 5, namely, the hologram plane 50 after propagation in the air and in the beam coupler 3, and thus this hologram is referred to as an inline reference light hologram $J_L$. The inline reference light hologram $j_L$ is deformed from a spherical wave as a result of passing through the beam coupler 3. This hologram $j_L$ can be derived by light wave propagation calculation using plane wave expansion by being given the distance p from the condensing point P2 of the inline spherical wave reference light L to the hologram plane 50 and the thickness dimension A of the beam coupler 3 as described later.

(Determination of Distance ρ to Condensing Point P2)

The distance ρ from the image sensor to the condensing point P2 of the inline spherical wave reference light L, which is used to calculate the inline reference light hologram $j_L$, can be determined by the following procedure. Instead of the object, a target T composed of a transparent plate having a scale pattern is arranged, and data of the target object light $O_T$ composed of the transmitted light when irradiated with the inline spherical wave reference light L is acquired as the target off-axis hologram $I_{TR}$ using the off-axis reference light R. It is assumed that the reference light off-axis hologram $I_{LR}$ has been acquired.

The distance ρ is tentatively set as a parameter and a temporary inline reference light hologram $j_L$ is generated. The target object light hologram $g_T$, representing the object light of the target T on the hologram plane 50, is generated using the target off-axis hologram $I_{TR}$, the reference light off-axis hologram $I_{LR}$ acquired beforehand, and the temporary inline reference light hologram $J_L$. The image of the target T is reconstructed at the position of the target T by converting the target object light hologram $g_T$ using light propagation calculation. The value of the parameter, when the size of the reconstructed image of the target T matches the original size of the target T, is determined as the value of the distance p. The size of the reconstructed image on the image reconstructing plane can be measured by the known pixel pitch of the image sensor 5, for example, CCD.

(Calculation of Spherical Wave after Passing Through Beam Coupler)

Figure 4:
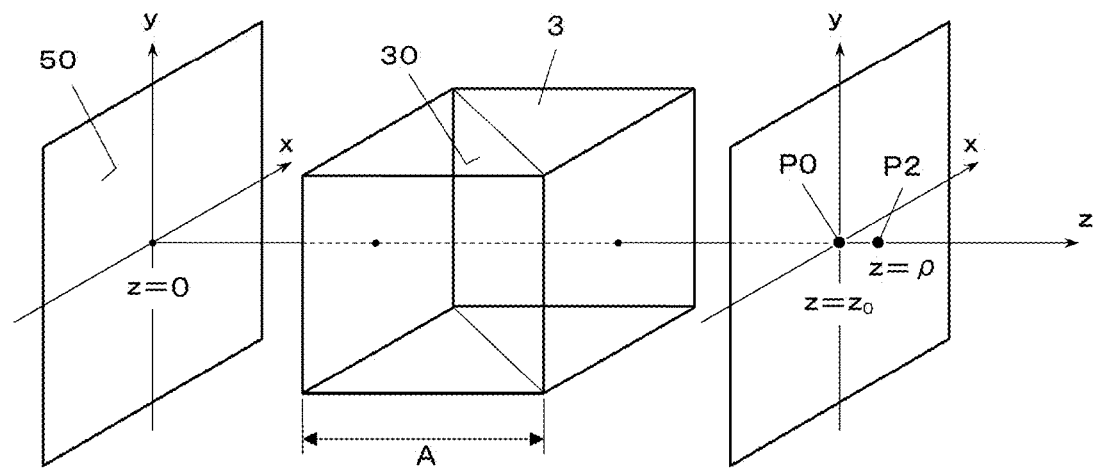
FIG. 4 is a perspective view showing an optical system and a coordinate system including a beam coupler used in the method.
Figure 5:
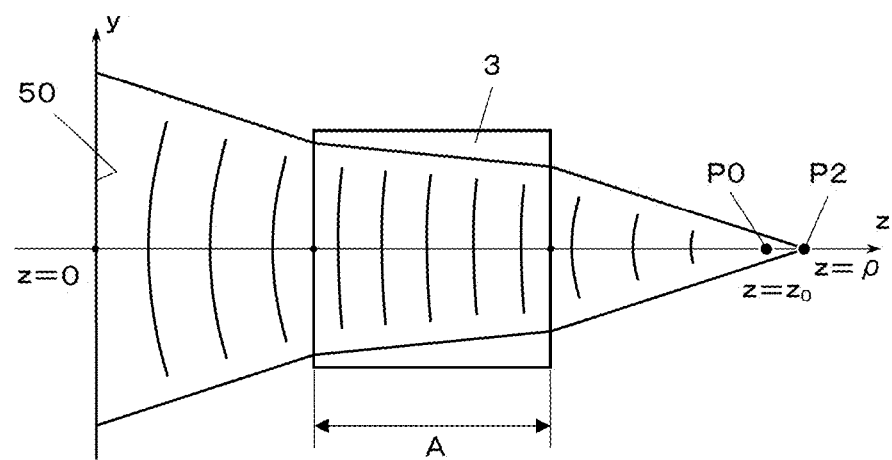
FIG. 5 is side view of FIG. 4.
Figure 6:
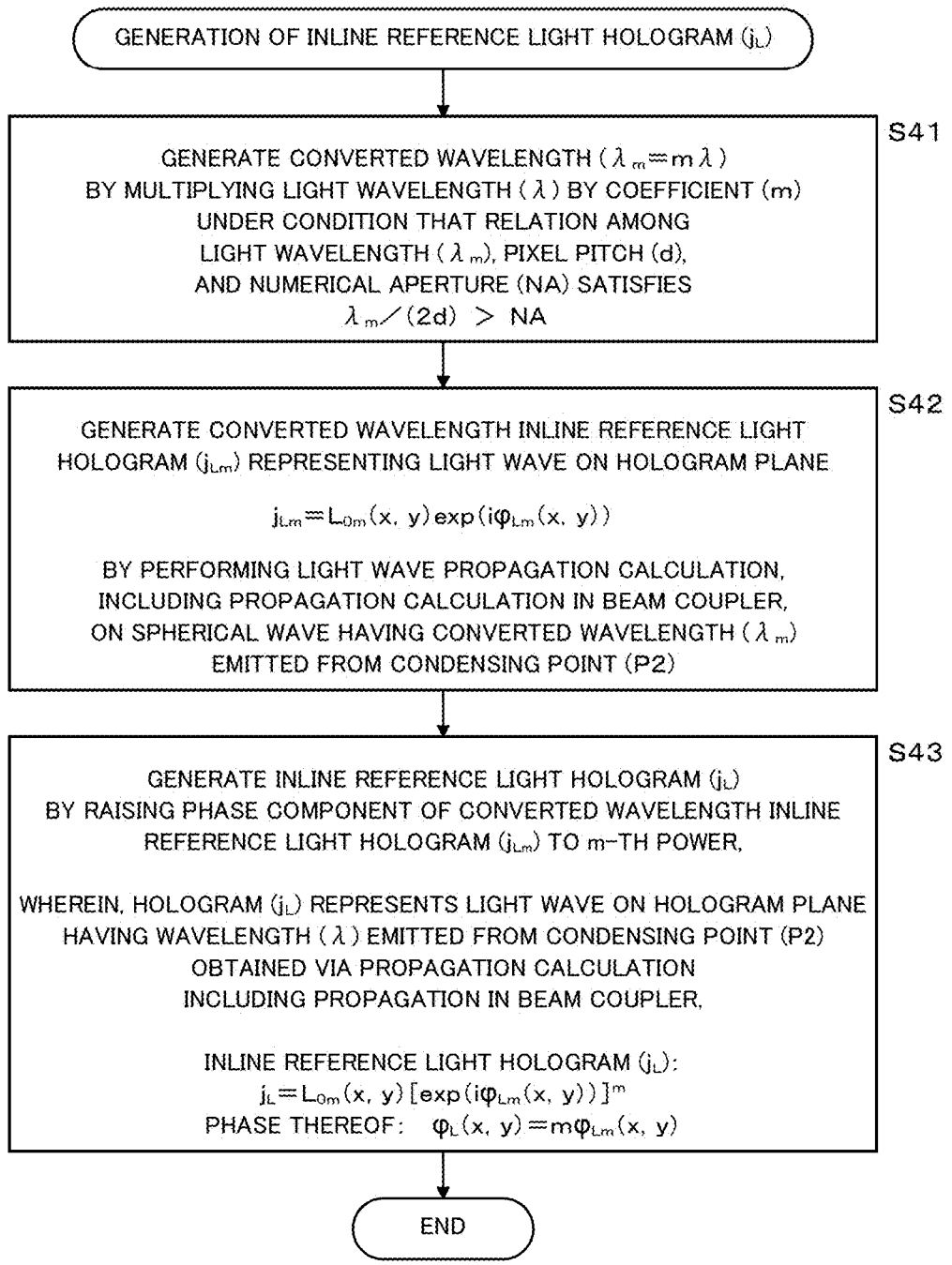
FIG. 6 is a flowchart showing a method for generating the spherical wave light hologram in the imaging method.

Next, the generation of the inline reference light hologram $j_L$ is described. As shown in FIG. 4 to FIG. 6, the inline reference light hologram $j_L$ is generated as a hologram of the inline spherical wave reference light L on the hologram plane 50 after passing the beam coupler by performing light wave propagation calculation on a light wave that reaches the hologram plane 50 at the incident surface of the image sensor 5 from the position of the condensing point P2 of the inline spherical wave reference light L. The light wave propagation calculation is performed using plane wave expansion. The inline reference light hologram $j_L$ is derived by expanding the reference light L into plane waves at the condensing point P2, propagating the plane waves in the air and in the beam coupler 3 to calculate each plane wave component on the hologram plane 50, and adding up the calculated plane wave components.

Refer to the coordinate system described in FIG. 4 and FIG. 5. The point light source $b_0\delta(x)\delta(y)$ of the inline spherical wave reference light L exists on the xy plane at the position z=ρ of the condensing point P2. The spatial frequency spectrum B (u, v) of this point light source has a constant value b0, and $B(u, v)=b_0$. Therefore, due to the propagation of the plane wave, the hologram of the inline spherical wave reference light L on the hologram plane 50 at z=0, that is, the inline reference light hologram $j_L$ is given by the following equation (9).

$$j_L = L_0(x, y)\exp(i\phi_L(x, y)) \qquad (9)$$
$$= b_0 \int\int \exp\{-i2\pi[w_n(u,v)A + w(u,v)(\rho - A)]\} \cdot$$
$$\exp[i2\pi(ux + vy)]dudv$$

$$w(u, v) = \sqrt{(1/\lambda)^2 - u^2 - v^2} \qquad (10a)$$

$$w_n(u, v) = \sqrt{(n/\lambda)^2 - u^2 - v^2} \qquad (10b)$$

In above equation (10b), n is the refractive index of the beam coupler 3. Above equation (9) is a function of both the distance ρ from the origin z=0 to the condensing point P2 and the thickness dimension A of the beam coupler 3 in the optical axis (z-axis) direction, but not a function of the distance from the origin to the beam coupler 3. That is, the same equation can be obtained regardless of the position of the beam coupler 3.

The above equation (9) is a theoretical calculation equation, and in actual calculation, it is necessary to perform the light wave propagation calculation with a calculation point number that satisfies the sampling theorem. However, when the number of calculation points increases, the calculation time becomes unrealistically long. Therefore, an approximate calculation is introduced as shown in FIG. 6.

A converted wavelength $\lambda_m = m\lambda$ is generated by multiplying the light wavelength λ by a coefficient m under the condition that the relationship among the converted wavelength $\lambda_m$, the pixel pitch d, and the numerical aperture NA satisfies $\lambda_m/(2d) > NA$ (S41).

Next, a converted wavelength inline reference light hologram $j_{Lm} = L_{0m}(x, y)\exp(i\varphi_{Lm}(x, y))$, representing a light wave on the hologram plane 50, is generated by performing the propagation calculation, including the propagation in the beam coupler 3, on the spherical wave having the converted wavelength $\lambda_m$ emitted from the condensing point P2 (S42).

Next, the inline reference light hologram $j_L = L_{0m}(x, y)[\exp(i\varphi_{Lm}(x, y))]^m$ is generated by raising the phase component (the term of exp) of the converted wavelength inline reference light hologram jam to m-th power, wherein the inline reference light hologram $j_L$ represents a light wave of a spherical wave of wavelength λ emitted from the condensing point P2 after propagation in the beam coupler 3 (S43). Thus, the phase $\varphi_L(x, y) = m\varphi_{Lm}(x, y)$ of the inline reference light hologram $j_L$ is obtained.

In the light wave propagation calculation described above, the phase $\varphi_{Lm}$ of the spherical wave on the hologram plane 50 after passing the beam coupler is calculated, by multiplying the light wavelength λ of the inline spherical wave reference light L by the coefficient m so as to lengthen the wavelength, and performing the light propagation calculation using the plane wave expansion method on the light having the converted wavelength mλ, and the phase $m\varphi_{Lm}$ is obtained by multiplying the phase $\varphi_{Lm}$ calculated for the light of the converted wavelength mλ by the coefficient m, and the obtained phase $m\varphi_{Lm}$ is set as the phase $\varphi_L$ of the inline reference light hologram FIG. 5 shows the propagation of a spherical wave-like reference light in the beam coupler 3 and in air. The amplitude of the spherical wave-like light wave along the in-phase surface is almost constant, and the spatial change of the amplitude can be ignored compared to the spatial change of the phase component $\exp(i\varphi_{Lm}(x, y))$. With respect to such spherical wave-like light, the phase component $\exp(i\varphi_L(x, y))$ of the light wavelength λ can be obtained by using the phase component $\exp(i\varphi_{Lm}(x, y))$ of the light wavelength λm and the following equation (11). The calculation of the optical phase by the following equation (11) is a wavefront-optics-like approximate calculation based on Huygens' principle.

$$\exp(i\phi_L(x,y)) = [\exp(i\phi_{Lm}(x,y))]^m \qquad (11)$$

It can be confirmed that this approximate calculation holds for spherical wave-like light produced by a point light source in an optical system actually used, by performing light wave propagation calculations for an optical wavelength with which numerical calculation is possible. For the light wavelength λ satisfying $\lambda/(2d) > NA$ and the converted wavelength $\lambda m = m\lambda$, the light wave propagation calculations are performed to calculate the phase component $\exp(i\varphi_L(x, y))$ and the phase component $\exp(i\varphi_{Lm}(x, y))$, respectively, and it can be confirmed that the relationship of the equation

(11) holds between them with high accuracy. Also, It can be confirmed by comparing the optical phase distribution $\varphi_L(x, y)$ of the light wavelength $\lambda$ obtained by using the above equation (11) with the phase distribution of the light of the light wavelength $\lambda$ calculated by the geometrical optical path tracing method.

(Object Light Hologram g(x, y))

By multiplying equation (8) by $L_0(x, y)\exp(i\varphi_L(x, y))$, an amplitude modulation by the amplitude factor $L_0(x, y)$ and a heterodyne modulation by the phase factor $\exp(i(\varphi_L(x, y))$ is performed, and the object light hologram g(x, y) representing the light wave of the object light O on the surface (hologram plane, xy plane, or surface z=0) of the image sensor 5 is obtained as the following equation (12). The step of generating the object light hologram g(x, y) is a step of reconstructing the object light O. The square of the absolute value $|g(x, y)|^2$ of the object light hologram g(x, y) can be displayed on a display to see the light intensity distribution of the object light O on the hologram plane 50 as an image. Similarly, an amplitude distribution image and a phase distribution image of the object light hologram g(x, y) can be displayed and viewed.

$$g(x,y))=O_0(x,y)\exp[(i\phi_O(x,y)] \quad (12)$$

(Plane Wave Expansion and Light Wave Propagation Calculation)

The light wave of the object light O can be expanded using plane waves being exact solutions of the Helmholtz equation for electromagnetic waves, and the light wave propagation calculation for propagating light wave can be performed. This plane wave expansion is performed by Fourier transforming the object light hologram g(x, y) of the above equation (12). That is, the Fourier transform is the plane wave expansion. As a result of the plane wave expansion, a spatial frequency spectrum G(u, v) of the object light O is obtained by the following equation (13). The spatial frequency spectrum G(u, v) is the complex amplitude of the plane wave having the wave number vector (u, v) and is also referred to as the complex amplitude G(u, v). Further, an object light h(x, y) on a reconstructing surface of z=z0 is obtained by the following equation (14) using the propagation of the plane wave.

$$G(u,v)=\iint g(x,y)\exp[-i2\pi(ux+vy)]dxdy \quad (13)$$

$$h(x,y)=\iint G(u,v)\exp\{i2\pi[w_n(u,v)A+w(u,v)(z_0-A)]\}\cdot\exp[i2\pi(ux+vy)]dudv \quad (14)$$

In the above equation (13), u and v are Fourier spatial frequencies in the x direction and the y direction, respectively. The Fourier spatial frequencies w and $w_n$ in the z direction are obtained from the dispersion equations (the relational expression between the wave number and the wavelength) of the plane wave as in the above equations (10a) and (10b). The dispersion equation contains information on the refractive index n on the optical path in the form of $(n/\lambda)^2$.

3rd Embodiment

The holographic imaging device 1 according to the 3rd embodiment is described with reference to FIG. 7 and FIG. 8. The holographic imaging device 1 of the present embodiment realizes a transmission type holographic microscope in which the object 4 is arranged close to the beam coupler 3. The holographic imaging device 1 includes the condenser lens 23, close to the beam coupler 3, for illuminating the object 4 with the illumination light Q having a condensing point. The optical system of the off-axis reference light R comprises the condenser lens 21 of small diameter and the pinhole plate 25 having a pinhole at a position of the condensing point P1 near the side surface of the beam coupler 3, so as to make the reference light R become spherical wave-like by forming the condensing point P1 and enter the beam coupler 3 from the side surface of the beam coupler 3.

The optical system of the inline spherical-wave reference light L comprises the condenser lens 23 for making the reference light L enter the beam coupler 3 from the front of the image sensor 5 after forming the condensing point P2, and the pinhole plate 24 having a pinhole at the position of the condensing point P2. The condenser lens 23 and the pinhole plate 24 are composed of high-performance optical components so that the inline spherical wave reference light L becomes an ideal spherical wave light.

In the optical system of the holographic imaging device 1, the condensing point P1 of the off-axis reference light R and the condensing point P2 of the inline spherical wave reference light L are arranged optically close to each other. Further, these condensing points P1 and P2 and the originating area of the object light O emitted radially, namely, the observation area are also arranged close to each other. The arrangement of such condensing points can increase the numerical aperture of each light effectively for the holographic microscope. Further, it is possible to narrow the spatial frequency band of the interference fringes formed and acquired on the image sensor 5 as the object light off-axis hologram $I_{OR}$ and the reference light off-axis hologram $I_{LR}$.

4th Embodiment

The holographic imaging device 1 according to the 4th embodiment is described with reference to FIG. 9 and FIG. 10. The holographic imaging device 1 of the present embodiment realizes a reflection type holographic microscope in which the object 4 is arranged close to the beam coupler 3. The optical system of the illumination light Q has, to realize the reflection type microscope, the large diameter condenser lens 26 on one side surface of the beam coupler 3 opposite to the side surface on which the off-axis reference light R is incident. The illumination light Q enters through the condenser lens 26, is reflected toward the object 4 by the internal reflecting mirror 30 of the beam coupler 3, and illuminates the back surface of the object 4, that is, the surface facing the image sensor 5, from the image sensor 5 side. The condenser lens 26 condenses the illumination light Q toward the object 4. Each optical system of the off-axis reference light R and the inline spherical wave light L is the same as that of the 3rd embodiment.

5th Embodiment

Figure 11:
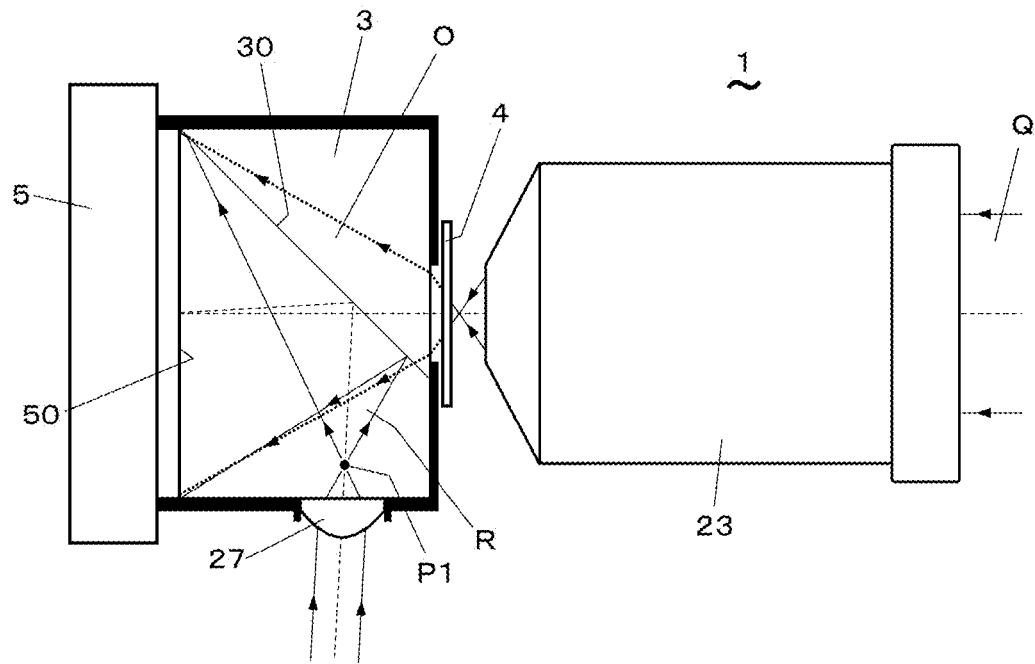
FIG. 11 is a side view showing a state in which the object light off-axis hologram is acquired by the holographic imaging device according to the 5th embodiment.
Figure 12:
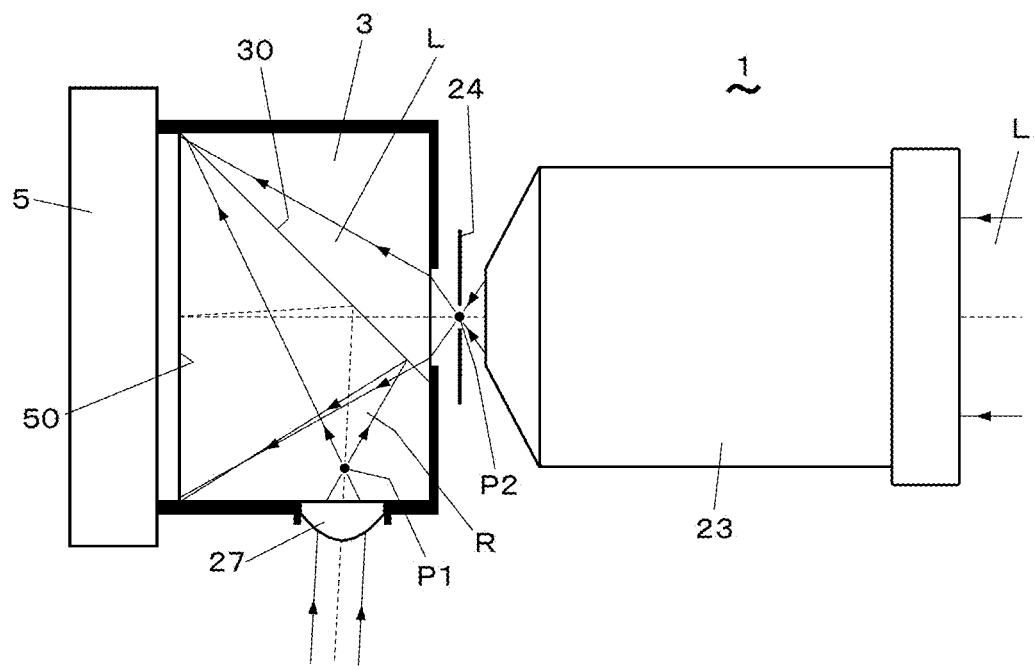
FIG. 12 is a side view showing a state in which the reference light off-axis hologram is acquired by the imaging device.

The holographic imaging device 1 according to the 5th embodiment is described with reference to FIG. 11 and FIG. 12. If a beam coupler having a large refractive index n is used in the optical system shown in FIG. 7 to FIG. 10, the numerical aperture NA can be increased. The numerical aperture can be increased up to about NA=0.63 when the refractive index n=1.5 and up to about NA=0.8 when the refractive index n=2.0. A method using a beam coupler having a small depth size is effective for obtaining a larger numerical aperture NA. The holographic imaging device 1 of the present embodiment is a microscope of increased numerical aperture NA up to a value close to 1 in the transmission type holographic microscope according to the 3rd embodiment. In order to increase the numerical aperture NA up to a value close to 1, the beam coupler 3 has a smaller thickness between two surfaces facing the image sensor 5 than a thickness between any other two surfaces. This means that a cube type BS having a small depth is used.

In addition, the lateral dimension of the beam coupler 3 is enlarged so that the object light O and the reference lights R, L entering the beam coupler 3 propagate therein and are received by the image sensor 5. In the optical system of the holographic imaging device 1, the condensing point P1 of the off-axis reference light R, the condensing point P2 of the inline spherical wave reference light L, and the generating area of the object light O radially emitted are configured to be optically close to each other. In order to realize this configuration, the optical system of the off-axis reference light R includes the lens 27 that forms the condensing point P1 of the off-axis reference light R inside the beam coupler 3. According to this holographic imaging device 1, the numerical aperture NA can be increased to a value close to 1 even when the refractive index n=1.5, and the resolution can reach the diffraction limit of light due to the large numerical aperture NA close to 1. Although FIG. 11 shows a transmission type optical system, if a object is illuminated with the illumination light Q as shown in FIG. 9, a reflection type microscope having a numerical aperture NA close to 1 can be realized.

6th Embodiment

Figure 13:
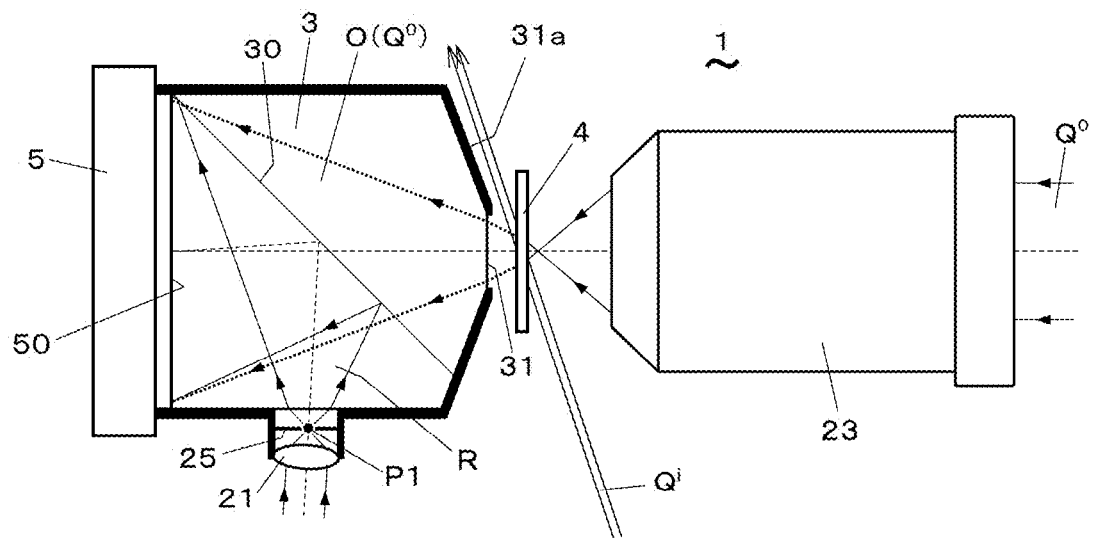
FIG. 13 is a side view showing a state in which the object light off-axis hologram is acquired by the holographic imaging device according to the 6th embodiment.

The holographic imaging device 1 according to the 6th embodiment is described with reference to FIG. 13. In the holographic imaging device 1 of the present embodiment, the beam coupler 3 has the chamfered portion(s) 31*a* formed thereon so as to prevent the beam coupler 3 in the transmission type holographic microscope according to the 3rd embodiment from interfering with the illumination light Q that obliquely illuminates the object 4. The chamfered portion 31*a* may be formed, for example, like a conical surface, or may be formed with a polygonal pyramid plane.

The holographic imaging device 1 is used to obtain a hologram having a synthetic numerical aperture larger than 1 and a high resolution image by synthesizing a plurality of holograms having different spatial frequency bands acquired using illumination lights from a plurality of microscopic observation in the object 4 is sequentially illuminated with the front illumination light $Q^0$ from the front of the image sensor 5 through the condenser lens 23, and the oblique illumination lights $Q^j$, j=1 ..., N from multiple directions formed in parallel beams. The object light off-axis hologram $I^j_{OR}$ is acquired for each illumination light $Q^j$, j=0, ..., N. Further, the reference light off-axis hologram $I_{LR}$ is acquired by the inline spherical wave light L propagating through a pinhole plate arranged instead of the object 4 and the condenser lens 23. From these holograms, a high resolution reconstructed image can be obtained using digital holography.

7th Embodiment

Figure 14:
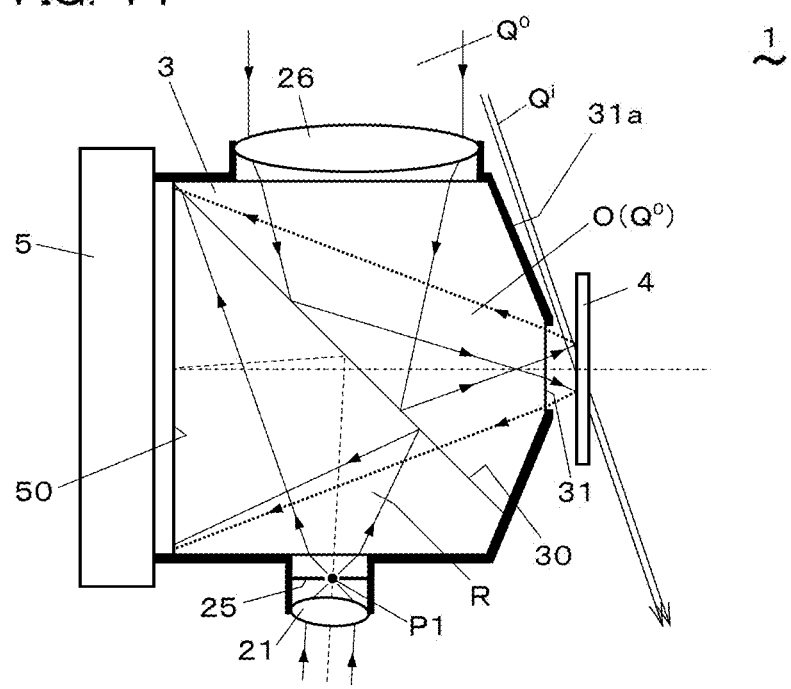
FIG. 14 is a side view showing a state in which the object light off-axis hologram is acquired by the holographic imaging device according to the 7th embodiment.

In the holographic imaging device 1 according to the 7th embodiment shown in FIG. 14, the beam coupler 3 has the chamfered portion(s) 31*a* formed thereon so as to prevent the beam coupler 3 in the reflection type holographic microscope according to the 4th embodiment from interfering with the illumination light Q that obliquely illuminates the object 4. According to this holographic imaging device 1, a high-resolution reconstructed image can be obtained as in the case of the holographic imaging device 1 of the 6th embodiment.

The holographic microscope of each of the above-described embodiments comprises a hologram recording compact unit (the data acquisition unit 10) and the reconstruction unit 12 being able to accurately reconstruct the object light, wherein the hologram recording compact unit comprises a beam coupler being provided with an image sensor and an optical system for the off-axis reference light. Such a hologram recording compact unit can be easily used as an immersion microscope, and can be placed in an immersion state to further improve the resolution.

8th Embodiment: Data Processing

The object light hologram g and the spatial sampling interval δ are described with reference to FIG. 15A to FIG. 17B. Each of the holographic imaging devices described above records the object light O using the off-axis reference light R having the condensing point P1 at a position close to the originating area of the object light O spreading therefrom in a spherical wave-like shape. Therefore, the recorded hologram of the interference fringes of the object light O and the reference light R has a narrow spatial frequency band. If a hologram of only the object light O is taken out alone from such a recorded hologram, the spatial frequency band becomes wide. From this, it can be seen that the object light hologram g(x, y) of the above equation (12) representing the wavefront of the object light O has wider spatial frequency band than the complex amplitude inline hologram $J_{OL}$(x, y) of the above equation (9).

The spatial change of the object light hologram g(x, y) increases as it moves away from the center of the hologram, and becomes maximum at the edge of the hologram. When the numerical aperture of the hologram is $NA_O$ and the light wavelength is λ, the maximum spatial frequency $f_M$ of the object light hologram g(x, y) is represented by $f_M = NA_O/\lambda$. Then, in order to express the wide band object light hologram g(x, y) by discrete values, it is necessary to set the spatial sampling interval $\delta = 1/(2f_M) = \lambda/(2NA_O)$, for example using data interpolation, due to the constraints of the sampling theorem. To overcome the constraints of the sampling theorem, sampling points are increased and data is interpolated. Since the complex amplitude inline hologram $J_{OL}$ of narrow band changes gently with the pixel pitch d of the image sensor 5, high-speed calculation using a cubic function is possible in data interpolation.

FIG. 15A and FIG. 15B show a method of reducing the spatial sampling interval δ of the hologram by using data interpolation in order to obtain the object light hologram g(x, y). The complex amplitude inline hologram $J_{OL}$ is obtained without using an imaging lens. Therefore, even if the spatial sampling interval is subdivided and reduced to about the optical wavelength, no distortion occurs. Therefore, it is possible to reduce the sampling interval by substantially increasing the number of pixels.

In the step of increasing the number of pixels, the spatial sampling interval d of the complex amplitude inline hologram $J_{OL}$ corresponding to the pixel pitch d of the image sensor 5 is subdivided into the spatial sampling interval δ. Then, data interpolation is performed on new sampling points generated by the subdivision to substantially increase the number of pixels. As a method of data interpolation, it is possible to use data interpolation by a well-known cubic function in image processing or data interpolation by a sinc function. If sinc interpolation is used as the data interpolation, the numerical calculation takes longer than the interpolation using the cubic function, but a more accurate result can be obtained.

The result of increasing the number of pixels for the complex amplitude inline hologram $J_{OL}$ by data interpolation will be used again as the complex amplitude inline hologram $J_{OL}$. The pixel pitch d of the image sensors 5 may be different from each other in the pixel arrangement direction (xy direction), and the spatial sampling intervals δ may be different from each other in the pixel arrangement direction. The complex-amplitude inline hologram $J_{OL}$ with the increased number of pixels becomes a hologram recording an image of enhanced resolution, which is an image magnified d/δ times without distortion based on the ratio between the pixel pitch d and the spatial sampling interval δ as compared with the hologram without the process of increasing the number of pixels.

(High-Speed Processing)

FIG. 16A, FIG. 16B, FIG. 17A, and FIG. 17B show a method of processing the object light hologram g(x, y) at high speed. In the hologram data processing using the fast Fourier transform (FFT), if the required number of sampling points becomes too large, it is difficult to process the object light hologram g(x, y). As is known, each information recorded in different frequency bands is preserved without being lost even if spatially overlapped. By utilizing this, the object light hologram g(x, y) being a large numerical aperture object light of wide band can be overlapped to form a minute hologram of wide band (a hologram having a smaller number of data points). Further, a hologram holds information for reconstructing a light wave in each of divided areas thereof.

Figure 17A:
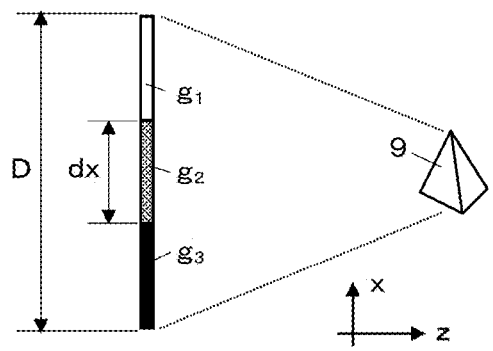
FIG. 17A is a conceptual diagram of a single hologram and a reconstructed image.

Therefore, as shown in FIG. 16A, the object light hologram g(x, y) is divided into a plurality of minute holograms $g_i$ having widths dx, dy, and as shown in FIG. 16B and FIG. 16C, the minute holograms $g_i$ are overlaid on each other to generate the synthetic minute hologram Σ. When the calculation based on the above equation (13) is performed on this synthetic minute hologram Σ, the calculation time is shortened and the complex amplitude g(u, v) is obtained. FIG. 17A shows how the object light hologram g(x, y) having the width D is divided into minute holograms $g_1$, $g_2$, $g_3$ having the widths dx, dy. This object light hologram g(x, y) reconstructs a light wave (the reconstructed image 9) by one hologram.

Figure 17B:
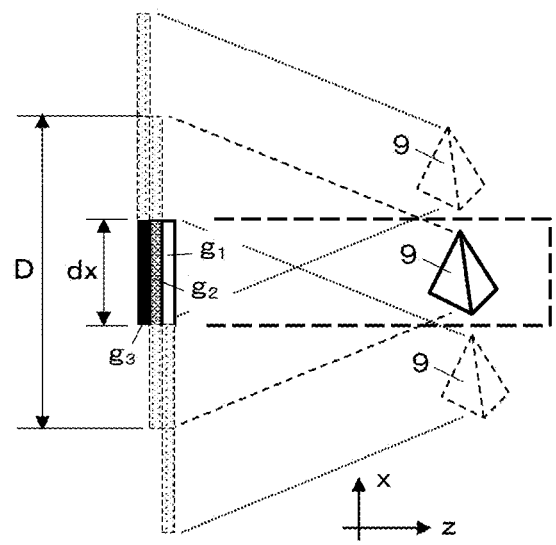
FIG. 17B shows a conceptual diagram of a plurality of holograms to be reconstructed and a plurality of reconstructed images for explaining the principle of a method for processing a hologram at high speed.

As shown in FIG. 17B, a hologram obtained by overlaying such object light holograms g(x, y) while shifting them by a width dx in the x direction becomes a periodic hologram having a width dx, a large number of holograms are formed, and the same reconstructed image 9 can be reconstructed at intervals of width dx. The number of calculation points is compressed to the reciprocal of the number of overlaid minute holograms $g_i$. That is, when n holograms are overlaid, the calculation amount becomes 1/n.

Example 1: Holographic Camera

Figure 18:
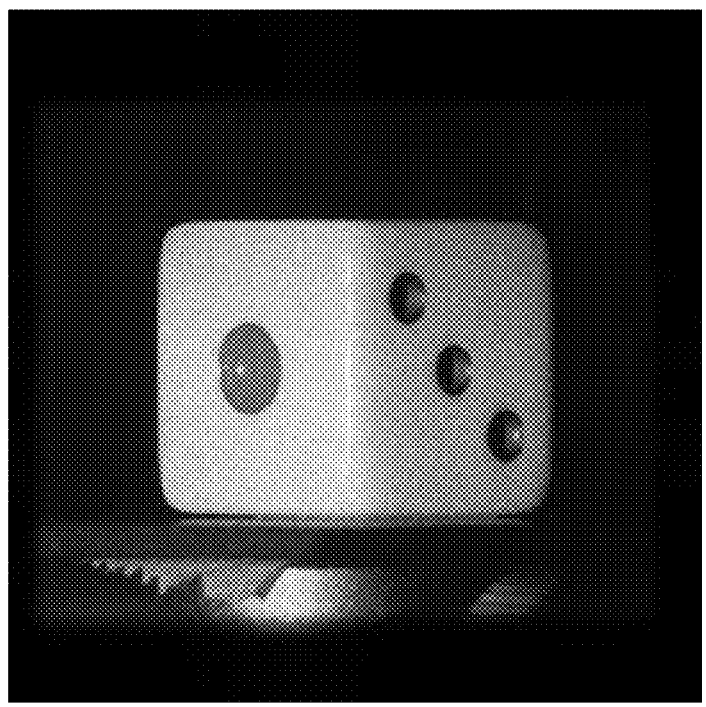
FIG. 18 is a color image captured using the holographic imaging device according to the present invention.

FIG. 18 is a color image obtained by using the holographic imaging device having the optical system of FIG. 1A and FIG. 1B. The object was a dice having a side length of 18 mm, and was placed at a position 64 cm from the image sensor 5. The numerical aperture NA of the recording hologram is NA=0.017. A blue semiconductor pumped solid-state laser (wavelength 473 nm, output 30 mW), a green semiconductor pumped solid-state laser (wavelength 532 nm, output 50 mW), and a red He—Ne laser (wavelength 632.8 nm, output 10 mW) were used as light sources.

A monochrome camera link CCD camera was used as the image sensor. The image in FIG. 6 (SIC) was obtained by overlaying the reconstructed images of blue, green, and red obtained by numerical calculation performing the light propagation calculation in the air and the beam coupler 3 composed of a cube-type beam splitter for each wavelength light. A high-quality color image without defocus, color shift, and distortion was reconstructed. This means that the object light recording using the cube-type beam splitter and the light propagation calculation in the air and the cube-type beam splitter are both accurately performed for the blue, green, and red wavelength lights.

Example 2: Transmission Type Holographic Microscope

Figure 7:
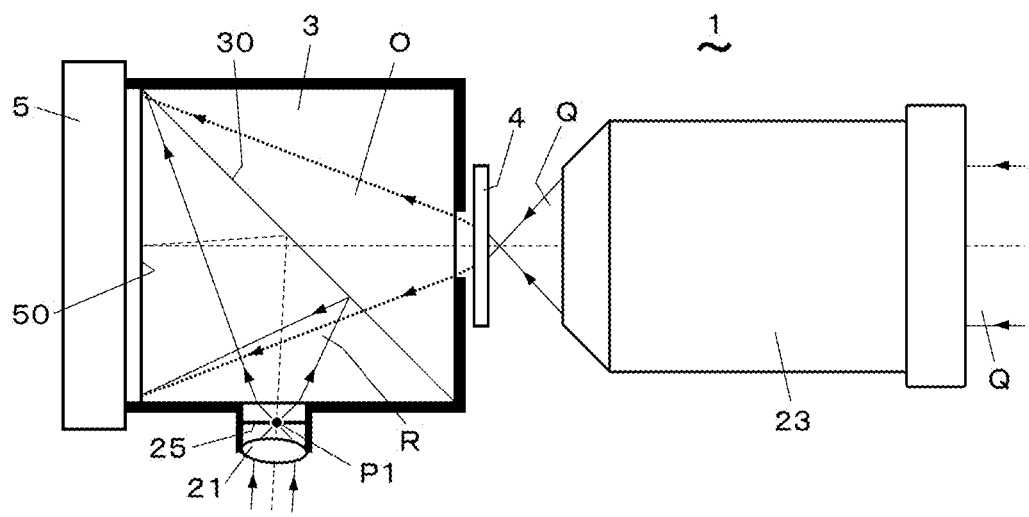
FIG. 7 is a side view showing a state in which the object light off-axis hologram is acquired by the holographic imaging device according to the 3rd embodiment.
Figure 8:
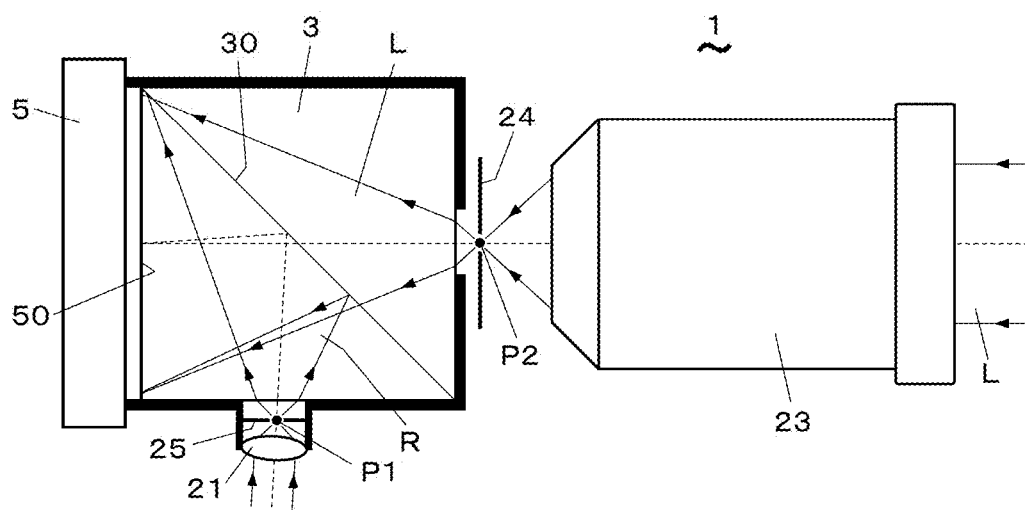
FIG. 8 is a side view showing a state in which the reference light off-axis hologram is acquired by the imaging device.
Figure 19A:
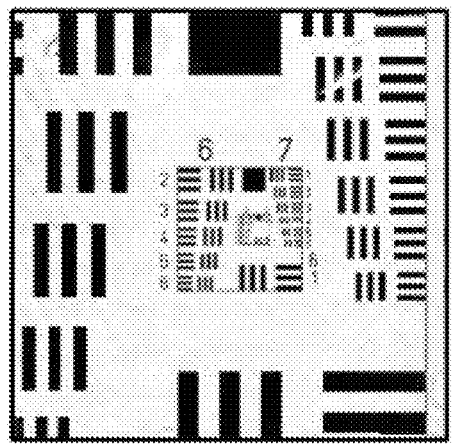
FIG. 19A is an image of a test target obtained by using the holographic imaging device according to the present invention as a transmission type holographic microscope.
Figure 19B:
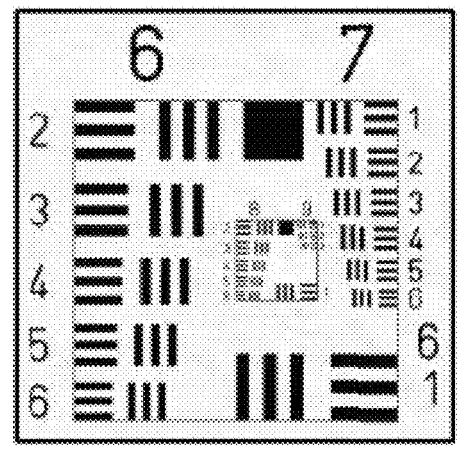
FIG. 19B is an enlarged image of a part of FIG. 19A.

FIG. 19A and FIG. 19B are images of the USAF test target obtained by using the optical system of the transmission type holographic microscope of FIG. 7 and FIG. 8. A blue semiconductor pumped solid-state laser (wavelength 473 nm, output 30 mW) was used as a coherent light source. The object of USAF test target was placed in front of the CCD camera, and interference fringes formed by the object light O and the off-axis reference light R were recorded. The object of USAF test target was removed and the interference fringes formed by the inline spherical wave reference light L and the off-axis reference light R were recorded.

The complex amplitude inline hologram $J_{OL}$ was generated from the two recorded interference fringes and was divided into 16×16 to obtain 256 divided recording holograms. Data interpolation and spatial heterodyne modulation were performed on each divided recording hologram, and then the divided holograms (the minute holograms $g_i$) were overlaid to obtain a minute hologram for image reconstruction (the synthetic minute hologram Σ). An image was reconstructed by performing numerical calculation using FFT on the obtained synthetic minute hologram Z.

FIG. 19A is the image of the USAF test target reconstructed from the synthetic minute hologram Σ, namely, the complex amplitude inline hologram $J_{OL}$, by performing the light propagation calculation not only in the air but also in the cube splitter. The numerical aperture NA of the recording hologram is NA=0.5, and the theoretical resolution for this numerical aperture is 0.457 μm. FIG. 19B is a partially enlarged reconstructed image of FIG. 19A.

No distortion is observed in the outer shapes of the large rectangular area a1, the rectangular area a2 therein, the rectangular area a3 therein in FIG. 19A, and the rectangular areas a2 and a3 in FIG. 19B. That is, it can be confirmed that the outer shapes of the rectangular areas a1, a2, and a3 are formed by straight lines, and it can be seen that the reconstructed image is not distorted. In addition, since the pattern having a width of 0.775 μm between the lines in FIG. 19B can be clearly identified, it can be seen that a resolution comparable to the theoretical value is obtained.

Comparative Example

Figure 20A:
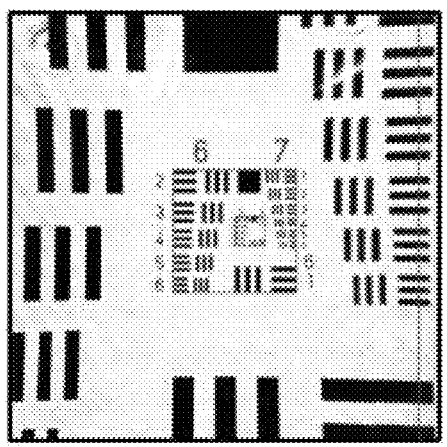
FIG. 20A is an image, as a comparative example, obtained by simplifying the light propagation calculation in the beam coupler for reconstructing the image of FIG. 19A by a light propagation calculation in air.
Figure 20B:
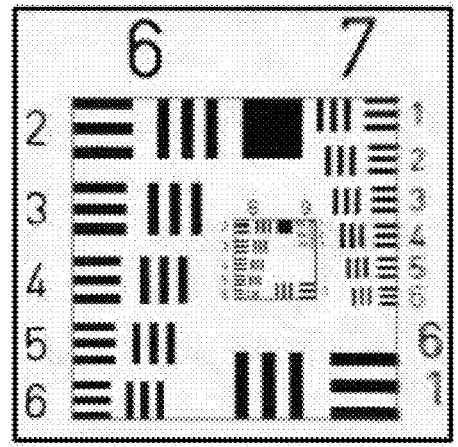
FIG. 20B is an enlarged image of a part of FIG. 20A.

FIG. 20A shows an image reconstructed by performing only light propagation calculation in air as a comparative example of FIG. 19A, and FIG. 20B shows a partially enlarged image thereof. In this light propagation calculation, the light propagation in the cube-type beam splitter was approximated to be the light propagation in the air having a depth of the cube depth multiplied by the refractive index of the cube.

Comparing FIG. 20A with FIG. 19A, image distortion and defocusing can be confirmed in the peripheral portion of FIG. 20A because of the approximation of light propagation. Further, comparing FIG. 20B with FIG. 19B, it can be seen that in FIG. 20B, the resolution is degraded and the image is blurred. Image distortion, defocus, and resolution degradation caused by the approximation of the light propagation calculation in the cube-type beam splitter are more magnified as the numerical aperture increases, and therefore, for the reconstruction of large numerical aperture object light, accurate light propagation calculations are required.

Example 3: Transmission Type Holographic Microscope

Figure 21:
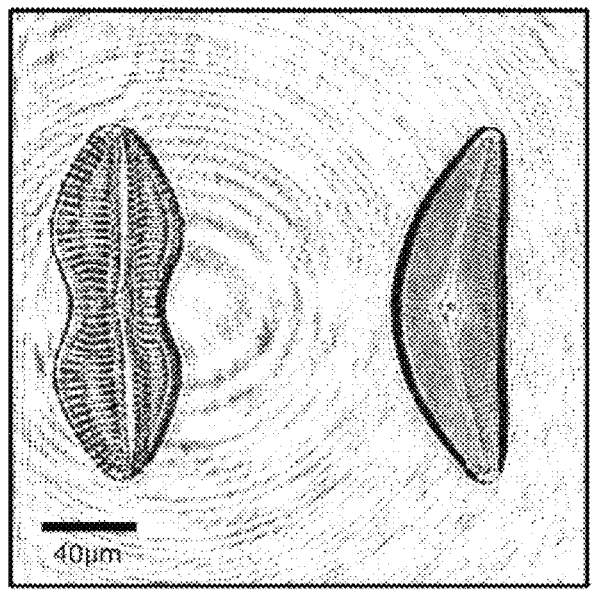
FIG. 21 is a light intensity image of dried diatoms obtained by the transmission type holographic microscope.
Figure 22:
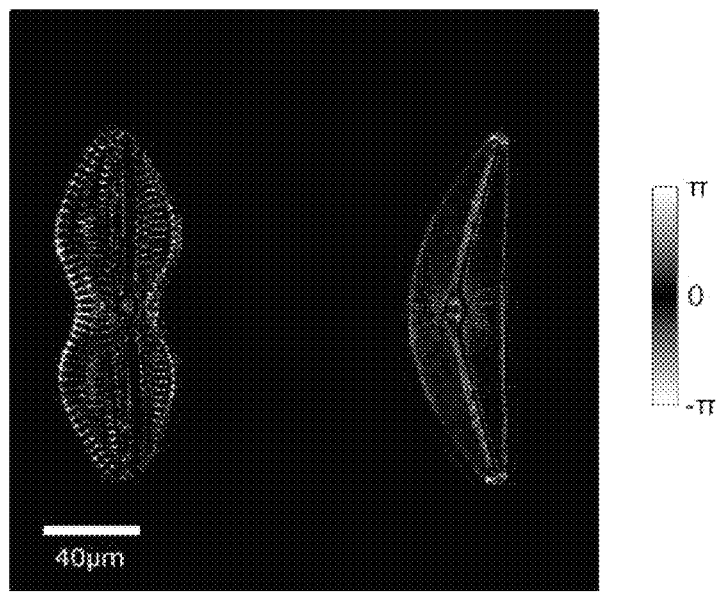
FIG. 22 is a phase difference image corresponding to the image in FIG. 21.

FIG. 21 is a light intensity image of dried diatom, and FIG. 22 is a phase difference image corresponding to the same light intensity image, which was imaged and reconstructed using the optical system of the transmission type holographic microscope of FIG. 7 and FIG. 8. The numerical aperture NA of the recording hologram is NA=0.5. The phase difference image of FIG. 10 (SIC) is an image showing the phase difference between the object light and the illumination light. A finer structure of the sample can be observed from the reconstructed light intensity image and the phase difference image.

Example 4: Reflection Type Holographic Microscope

Figure 9:
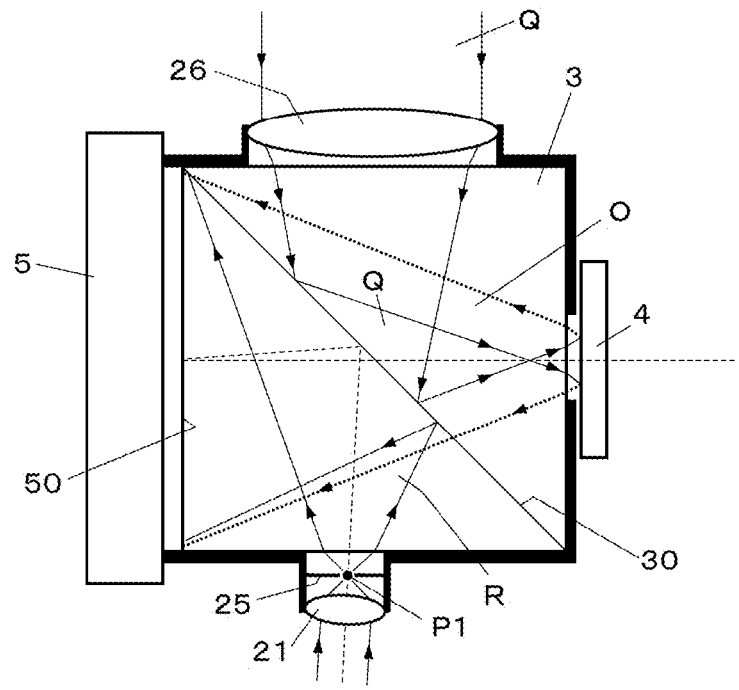
FIG. 9 is a side view showing a state in which the object light off-axis hologram is acquired by the holographic imaging device according to the 4th embodiment.
Figure 10:
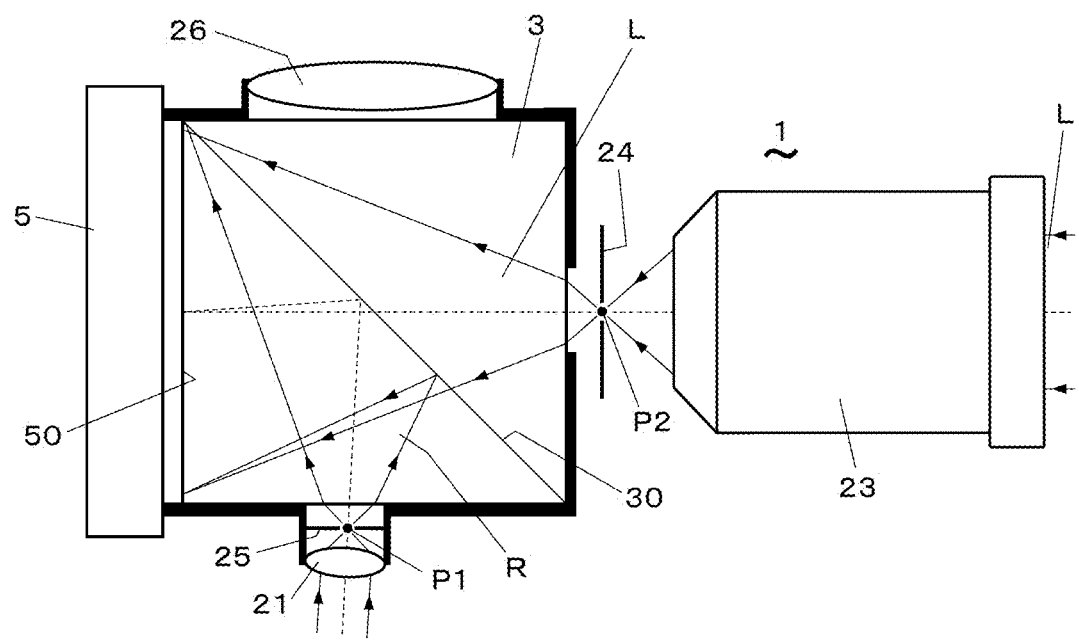
FIG. 10 is a side view showing a state in which the reference light off-axis hologram is acquired by the imaging device.
Figure 23A:
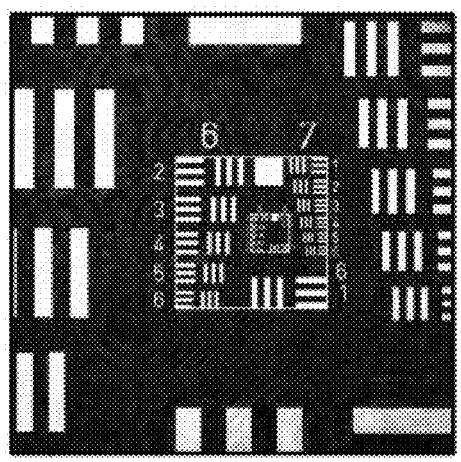
FIG. 23A is an image of a test target obtained by using the holographic imaging device according to the present invention as a reflection type holographic microscope.
Figure 23B:
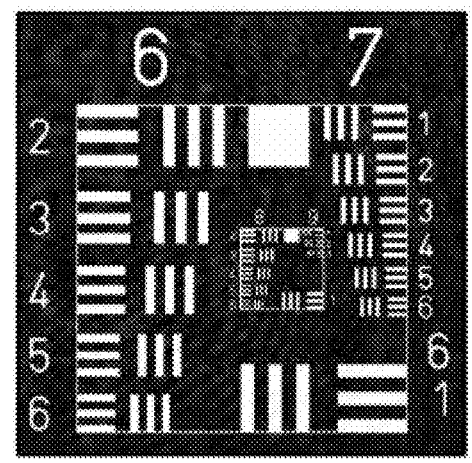
FIG. 23B is an enlarged image of a part of FIG. 23A.

FIG. 23A and FIG. 23B are images of the USAF test target obtained by using the optical system of the reflection type holographic microscope of FIG. 9 and FIG. 10. The numerical aperture NA of the recording hologram is NA=0.5, and the theoretical resolution is 0.457 μm. Further, in the partially enlarged image of FIG. 23B, no distortion is seen in the rectangular area a1 and the rectangular area a2 therein. That is, it can be seen that the reconstructed image has no distortion. Further, the pattern having a width of 0.775 μm between the lines in FIG. 23B can be clearly identified, and it can be seen that the resolution of the reflection type is similar to that of the transmission type.

Note that the present invention is not limited to the above configuration, and various modifications can be made. For example, the configurations of the above-described embodiments may be combined with each other. Further, the cube-type beam coupler 3 may be a cube-type non-polarizing beam coupler, and a holographic imaging device in which a polarizing element is incorporated in the optical system 2 may be used. Such a holographic imaging device can be applied to a polarization holographic microscope and ellipsometry, and can accurately record a polarized object light in one shot.

INDUSTRIAL APPLICABILITY

The novelty and superiority of the present invention over the prior art include: (1) accurate one-shot recording of object light of a wide range numerical aperture is possible; (2) compact optical system for recording with a simple and stable structure can be configured; (3) numerical aperture NA of recording object light can be increased to a value close to 1; (4) same optical system is applicable for transmission type, reflection type, and polarization type high resolution holographic microscope for hologram recording; and (5) it is possible to avoid the influence of surface reflected light or stray light by light reflection prevention treatment or light absorption treatment on the beam coupler surface.

Due to the above advantages, the present invention can be used for a wide range of applications in the fields of optics, digital holography, optical measurement, applied optical information, and microscopes by utilizing these advantages. Further, from the viewpoint of technological application, it can be considered to be used in fields such as precision measurement, nanotechnology, biological optical measurement, biotechnology, and medical diagnosis. Specific applications include: high-precision detection and measurement of minute scratches and dust on the surface; precise optical measurement of particles in volume; long working distance wide-field high-resolution measurement or ultra-high resolution measurement of living tissues and living cells in culture solution; ultra-high resolution measurement of living biological tissue by low energy illumination; ultra-high resolution measurement of transparent biological tissue using optical phase and/or polarization; and ultra-high resolution three-dimensional optical measurement using reflected object light, etc.

EXPLANATIONS OF LETTERS OR NUMERALS

1 Holographic imaging device
2 Optical system
3 Beam coupler
31a Chamfered portion
4 Object
5 Image sensor
50 Hologram plane
6 Data storage unit
10 Data acquisition unit
12 Image reconstruction unit
13 Complex amplitude hologram generation unit
14 Calculation reference light hologram generation unit
15 Object light hologram generation unit
$I_{LR}$ Reference light off-axis hologram
$I_{OR}$ Object light off-axis hologram
$I_{TR}$ Target off-axis hologram
$j_L$ Inline reference light hologram
$j_{Lm}$ Converted wavelength inline reference light hologram
$J_{OL}$ Complex amplitude inline hologram of object light
O Object light
$O_T$ Object light of target
Q Illumination light
R Off-axis reference light
L Inline spherical wave reference light
P2 Condensing point of inline spherical wave reference light
P1 Condensing point of off-axis reference light
T Target
g Object light hologram
$g_T$ Target object light hologram
h Reconstructed object light hologram
m Coefficient
ρ Distance from image sensor to condensing point of inline spherical wave reference light
$φ_L$ Phase
$φ_{Lm}$ Phase
λ Optical wavelength
$λ_m$ Converted wavelength

The invention claimed is:

1. A holographic imaging device, comprising:
a data acquisition unit for acquiring data of an object light (O) emitted from an illuminated object and data of an inline spherical wave reference light (L) being inline with the object light (O), electronically and individually, as two kinds of off-axis holograms ($I_{OR}$, $I_{LR}$) on a hologram plane defined at a light receiving surface of an image sensor, using an off-axis reference light (R) maintained under the same conditions; and an image reconstruction unit for reconstructing an image of the object from the data acquired by the data acquisition unit, wherein the data acquisition unit comprises:

a beam coupler consisting of a cube-type beam splitter, wherein the data acquisition unit acquires data of two lights of the object light (O) and the inline spherical wave reference light (L), passing through the beam coupler and being incident on the image sensor as the data of the two kinds of the off-axis holograms ($I_{OR}$, $I_{LR}$), individually, the image reconstruction unit comprises:

a complex amplitude hologram generation unit for generating a complex amplitude inline hologram ($J_{OL}$) on the hologram plane, containing information on both of the object light (O) and the inline spherical wave reference light (L), from the data of the two kinds of the off-axis holograms ($I_{OR}$, $I_{LR}$);

a calculation reference light hologram generation unit for generating an inline reference light hologram ($j_L$) representing a light wave of the inline spherical wave reference light (L) on the hologram plane by performing a light wave propagation calculation, based on the information on a position of a condensing point (P2) of the inline spherical wave reference light (L), using a plane wave expansion method, including propagation calculation inside the beam coupler in consideration of refractive index of the beam coupler; and an object light hologram generation unit for generating an object light hologram (g) being a hologram of the object light (O), on the hologram plane, by eliminating components of the inline spherical wave reference light (L) from the data of the complex amplitude inline hologram ($J_{OL}$) using the data of the inline reference light hologram ($j_L$).

2. The holographic imaging device according to claim 1, wherein
the calculation reference light hologram generation unit calculates a phase ($\varphi_{Lm}$) of a spherical wave light on the hologram plane by performing a light wave propagation calculation from the condensing point (P2) of the inline spherical wave reference light (L) to the hologram plane, using a plane wave expansion method, on a light having a converted wavelength ($m\lambda$) lengthened by multiplying the wavelength ($\lambda$) of the inline spherical wave reference light (L) by a coefficient (m), and generates the inline reference light hologram ($j_L$) by obtaining a phase ($m\varphi_{Lm}$) thereof, wherein the phase ($m\varphi_{Lm}$) thereof is obtained by multiplying the phase ($\varphi_{Lm}$) calculated from the light having the converted wavelength ($m\lambda$) by the coefficient (m).

3. The holographic imaging device according to claim 1, wherein
the off-axis reference light (R) is a spherical wave-like light having a condensing point (P1), and is incident on a side surface of the beam coupler, and
the condensing point (P1) of the off-axis reference light (R) and a condensing point (P2) of the inline spherical wave reference light (L) are optically close to each other.

4. The holographic imaging device according to claim 3, wherein
the condensing point (P1) of the off-axis reference light (R) and the condensing point (P2) of the inline spherical wave reference light (L) are close to the beam coupler, and the holographic imaging device is used as a microscope.

5. The holographic imaging device according to claim 4, wherein
the beam coupler is configured so that a thickness in an optical axis direction of the beam coupler, along which the object light (O) is incident, is thinner than a thickness in a lateral direction of the beam coupler, along which the off-axis reference light (R) is incident, and the condensing point (P1) of the off-axis reference light (R) is inside the beam coupler.

6. The holographic imaging device according to claim 4, wherein
the beam coupler has a chamfered portion formed so that the illumination light (Q) for illuminating the object from an oblique direction does not interfere with the beam coupler.

7. The holographic imaging device according to claim 4, wherein
the illumination light (Q) for illuminating the object is incident on the beam coupler from a side surface of the beam coupler that is opposite to the side surface of the beam coupler on which the off-axis reference light (R) is incident, and the holographic imaging device is used as a reflection type microscope.

8. A holographic imaging method, comprising the steps of:
acquiring data of an object light (O), emitted from an illuminated object and propagating straight within a beam coupler consisting of a cube-type beam splitter and incident on an image sensor, as an object light off-axis hologram ($I_{OR}$) using an off-axis reference light (R) incident on the beam coupler from a side surface thereof, reflected therein, and incident on the image sensor;

acquiring data of the off-axis reference light (R) as a reference light off-axis hologram ($I_{LR}$) by the image sensor using an inline spherical wave reference light (L) being inline with the object light (O);

generating a complex amplitude inline hologram ($J_{OL}$) on a hologram plane defined at a light receiving surface of the image sensor from the data of the object light off-axis hologram ($I_{OR}$) and the reference light off-axis hologram ($I_{LR}$);

generating an inline reference light hologram ($j_L$) representing a light wave of the inline spherical wave reference light (L) on the hologram plane by performing a light wave propagation calculation, based on the information on a position of a condensing point (P2) of the inline spherical wave reference light (L), using a plane wave expansion method, on a spherical wave emitted from the condensing point (P2) of the inline spherical wave reference light (L), including propagation calculation inside the beam coupler in consideration of refractive index of the beam coupler; and generating an object light hologram (g) representing a hologram of the object light (O) on the hologram plane, by eliminating components of the inline spherical wave reference light (L) from the data of the complex amplitude inline hologram ($J_{OL}$) of the object light using the data of the inline reference light hologram ($j_L$).

9. The holographic imaging method according to claim 8, wherein
the light wave propagation calculation for calculating the inline reference light hologram ($j_L$) is performed
by calculating a phase ($\varphi_{Lm}$) of a spherical wave light on the hologram plane by performing a light wave propagation calculation from the condensing point (P2) of the inline spherical wave reference light (L) to the hologram plane, using a plane wave expansion method, on a light having a converted wavelength (mx) lengthened by multiplying the wavelength ($\lambda$) of the inline spherical wave reference light (L) by a coefficient (m), and
by generating the inline reference light hologram ($j_L$) by obtaining a phase ($m\varphi_{Lm}$) thereof by multiplying the phase ($\varphi_{Lm}$) calculated from the light having the converted wavelength ($m\lambda$) by the coefficient (m).

10. The holographic imaging method according to claim 8, wherein
a distance ($\rho$) from the image sensor to the condensing point (P2) of the inline spherical wave reference light (L) is used for calculating the inline reference light hologram ($j_L$), wherein the distance ($\rho$) is derived by:
acquiring data of a target object light ($O_T$), being a transmitted light of the inline spherical wave reference light (L) irradiating a target consist of a scale pattern on a transparent plate arranged at the position of and instead of the object, as a target off-axis hologram ($I_{TR}$) using the off-axis reference light (R);
generating the inline reference light hologram ($j_L$) using the distance ($\rho$) as a parameter;
generating a target object light hologram (gr) representing an object light of the target on the hologram plane using the target off-axis hologram ($I_{TR}$), the reference light off-axis hologram ($I_{LR}$), and the inline reference light hologram ($j_L$);
reconstructing an image of the target at a position of the target by performing a light wave propagation calculation, for a position transformation, on the target object light hologram (gr);
determining the distance ($\rho$) as a value of the parameter when a size of the reconstructed image of the target matches the size of the target.

11. The holographic imaging method according to claim 9, wherein
a distance ($\rho$) from the image sensor to the condensing point (P2) of the inline spherical wave reference light (L) is used for calculating the inline reference light hologram ($j_L$), wherein the distance ($\rho$) is derived by:
acquiring data of a target object light ($O_T$), being a transmitted light of the inline spherical wave reference light (L) irradiating a target consist of a scale pattern on a transparent plate arranged at the position of and instead of the object, as a target off-axis hologram ($I_{TR}$) using the off-axis reference light (R);
generating the inline reference light hologram ($j_L$) using the distance ($\rho$) as a parameter;
generating a target object light hologram (gr) representing an object light of the target on the hologram plane using the target off-axis hologram ($I_{TR}$), the reference light off-axis hologram ($I_{LR}$), and the inline reference light hologram ($j_L$);
reconstructing an image of the target at a position of the target by performing a light wave propagation calculation, for a position transformation, on the target object light hologram (gr);
determining the distance ($\rho$) as a value of the parameter when a size of the reconstructed image of the target matches the size of the target.

12. The holographic imaging device according to claim 2, wherein
the off-axis reference light (R) is a spherical wave-like light having a condensing point (P1), and is incident on a side surface of the beam coupler, and
the condensing point (P1) of the off-axis reference light (R) and a condensing point (P2) of the inline spherical wave reference light (L) are optically close to each other.

13. The holographic imaging device according to claim 12, wherein
the condensing point (P1) of the off-axis reference light (R) and the condensing point (P2) of the inline spherical wave reference light (L) are close to the beam coupler, and the holographic imaging device is used as a microscope.

14. The holographic imaging device according to claim 13, wherein
the beam coupler is configured so that a thickness in an optical axis direction of the beam coupler, along which the object light (O) is incident, is thinner than a thickness in a lateral direction of the beam coupler, along which the off-axis reference light (R) is incident, and the condensing point (P1) of the off-axis reference light (R) is inside the beam coupler.

15. The holographic imaging device according to claim 14, wherein
the beam coupler has a chamfered portion formed so that the illumination light (Q) for illuminating the object from an oblique direction does not interfere with the beam coupler.

16. The holographic imaging device according to claim 13, wherein
the beam coupler has a chamfered portion formed so that the illumination light (Q) for illuminating the object from an oblique direction does not interfere with the beam coupler.

17. The holographic imaging device according to claim 5, wherein
the beam coupler has a chamfered portion formed so that the illumination light (Q) for illuminating the object from an oblique direction does not interfere with the beam coupler.

18. The holographic imaging device according to claim 13, wherein
the illumination light (Q) for illuminating the object is incident on the beam coupler from a side surface of the beam coupler that is opposite to the side surface of the beam coupler on which the off-axis reference light (R) is incident, and the holographic imaging device is used as a reflection type microscope.

* * * * *